(12) United States Patent
Ogawa et al.

(10) Patent No.: US 11,548,354 B2
(45) Date of Patent: Jan. 10, 2023

(54) WINDSHIELD

(71) Applicant: NIPPON SHEET GLASS COMPANY, LIMITED, Tokyo (JP)

(72) Inventors: Ryohei Ogawa, Tokyo (JP); Kazuki Chiba, Tokyo (JP); Hisashi Ogawa, Tokyo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 30 days.

(21) Appl. No.: 16/767,843

(22) PCT Filed: Nov. 28, 2018

(86) PCT No.: PCT/JP2018/043884
§ 371 (c)(1),
(2) Date: Jul. 17, 2020

(87) PCT Pub. No.: WO2019/107460
PCT Pub. Date: Jun. 6, 2019

(65) Prior Publication Data
US 2021/0001695 A1    Jan. 7, 2021

(30) Foreign Application Priority Data
Nov. 29, 2017 (JP) .............................. JP2017-229728

(51) Int. Cl.
*B32B 3/02*    (2006.01)
*B60J 1/00*    (2006.01)
(Continued)

(52) U.S. Cl.
CPC ................. *B60J 1/002* (2013.01); *B32B 3/02* (2013.01); *B32B 7/12* (2013.01);
(Continued)

(58) Field of Classification Search
CPC ..... B32B 3/266; B32B 7/12; B32B 17/10036; B32B 17/10165; B32B 17/10293; B60J 1/001; B60J 1/002
See application file for complete search history.

(56) References Cited

U.S. PATENT DOCUMENTS 5,798,499 A    8/1998    Shibata et al.
2009/0147360 A1    6/2009    Oskarsson et al.
(Continued)

FOREIGN PATENT DOCUMENTS

DE    102004054161 B4    10/2006
EP    1605729 A2    12/2005
(Continued)

OTHER PUBLICATIONS

Extended European Search Report for European Application No. 18882991.5, dated Jul. 30, 2021.
(Continued)

*Primary Examiner* — Elizabeth E Mulvaney
(74) *Attorney, Agent, or Firm* — Birch, Stewart, Kolasch & Birch, LLP

(57) ABSTRACT

A laminated glass according to the present invention is a windshield for an automobile to which an information acquisition device for acquiring information from the outside of a vehicle by emitting and/or receiving light can be installed, the windshield including an outer glass plate that includes a first side and a second side that is opposite to the first side, an inner glass plate that is arranged opposite to the outer glass plate and has substantially the same shape as the outer glass plate, and an intermediate film that is arranged between the outer glass plate and the inner glass plate. The windshield includes an information acquisition region that is to be located opposite to the information acquisition device and through which the light passes.

11 Claims, 17 Drawing Sheets

(51) Int. Cl.
  *B32B 7/12* (2006.01)
  *B32B 17/10* (2006.01)
  *H05B 3/84* (2006.01)

(52) U.S. Cl.
  CPC .. *B32B 17/10036* (2013.01); *B32B 17/10385* (2013.01); *B60J 1/001* (2013.01); *H05B 3/84* (2013.01); *B32B 2605/006* (2013.01)

(56) References Cited

U.S. PATENT DOCUMENTS

| | | | |
|---|---|---|---|
| 2010/0314378 | A1 | 12/2010 | Grunert et al. |
| 2011/0042370 | A1 | 2/2011 | Choi et al. |
| 2012/0152930 | A1 | 6/2012 | Chamberlain |
| 2016/0311402 | A1 | 10/2016 | Suetsugu et al. |
| 2019/0389429 | A1* | 12/2019 | Chiba .................. B60S 1/02 |
| 2020/0316917 | A1* | 10/2020 | Ogawa ................. B60J 1/20 |
| 2021/0162716 | A1* | 6/2021 | Gima ................ B32B 17/1022 |

FOREIGN PATENT DOCUMENTS

| | | | |
|---|---|---|---|
| EP | 1 672 960 | A1 | 6/2006 |
| JP | 11-208421 | A | 8/1999 |
| JP | 2000-30847 | A | 1/2000 |
| JP | 2006-96331 | A | 4/2006 |
| JP | 2006-168728 | A | 6/2006 |
| JP | 2011-510893 | A | 4/2011 |
| JP | 2011-515809 | A | 5/2011 |
| JP | 2011-210487 | A | 10/2011 |
| JP | 2013-503424 | A | 1/2013 |
| JP | 2016-102056 | A | 6/2016 |
| JP | WO2016/129699 | A1 | 8/2016 |
| JP | 2017-114484 | A | 6/2017 |

OTHER PUBLICATIONS

Japanese Office Action for Japanese Application No. 2017-229728, dated Sep. 21, 2021, with an English translation.
International Search Report issued in PCT/JP2018/043884 (PCT/ISA/210), dated Jan. 29, 2019.
Written Opinion of the International Searching Authority issued in PCT/JP2018/043884 (PCT/ISA/237), dated Jan. 29, 2019.
Chinese Office Action and Search Report for Chinese Application No. 201880076581.3, dated Jan. 19, 2022, with English translation.
Japanese Office Action for Japanese Application No. 2017-229728, dated May 18, 2021, with English translation.
Japanese Office Action for Japanese Application No. 2017-229728, dated Aug. 16, 2022, with an English translation.

* cited by examiner (a)

(b)

WINDSHIELD

TECHNICAL FIELD

The present invention relates to a windshield.

BACKGROUND ART

In recent years, safety performance of automobiles has dramatically improved. For example, a safety system has been proposed that detects a distance to a preceding vehicle and its speed and automatically operates a brake when the preceding vehicle comes abnormally close in order to avoid collision with the preceding vehicle. Such a system measures the distance to the preceding vehicle or the like using a laser radar or a camera. The laser radar or camera is typically arranged on the inner side of a windshield and measurement is performed by emitting light such as infrared rays forward (Patent Literature 1, for example).

As described above, measurement devices such as the laser radar and the camera are arranged on the inner surface side of a glass plate that constitutes the windshield and light is emitted or received through the glass plate. However, the glass plate may fog up on cold days and in cold regions. If the glass plate fogs up, there is a risk that the measurement devices cannot accurately emit or receive light. This may result in a failure to accurately calculate a distance between vehicles or the like.

The above-described problem may arise not only in measurement devices that measure a distance between vehicles but also in general information acquisition devices that acquire information from the outside of a vehicle by receiving light such as a rain sensor, a light sensor, or an optical beacon, for example.

CITATION LIST

Patent Literature

Patent Literature 1: JP 2006-96331A

SUMMARY OF INVENTION

Technical Problem

To solve the above-described problem, arranging heating wires in a region through which light passes has been proposed. However, although generation of a sufficient amount of heat is required in this region to accurately acquire information using an information acquisition device, the required amount of heat cannot be generated by merely arranging heating wires. The present invention was made to solve the above-described problem, and it is an object of the present invention to provide a windshield that enables heat generation such that information can be accurately acquired using an information acquisition device.

Solution to Problem

Aspect 1.
A windshield for an automobile to which an information acquisition device for acquiring information from the outside of a vehicle by emitting and/or receiving light can be installed, the windshield including:
an outer glass plate that includes a first side and a second side that is opposite to the first side;
an inner glass plate that is arranged opposite to the outer glass plate and has substantially the same shape as the outer glass plate; and
an intermediate film that is arranged between the outer glass plate and the inner glass plate,
wherein the windshield includes an information acquisition region that is to be located opposite to the information acquisition device and through which the light passes,
the intermediate film includes:
at least one adhesive layer; and
a heat generation layer that is supported by the adhesive layer,
the heat generation layer includes, at least in a region that corresponds to the information acquisition region:
a pair of bus bars that are arranged such that the information acquisition region is interposed therebetween; and
a plurality of first heating wires that are connected in parallel so as to connect the bus bars to each other, and
each of the heating wires has a wire width not larger than 10 μm.

Aspect 2.
The windshield according to Aspect 1, wherein at least in a portion of each of the first heating wires, the wire width of the first heating wire is equal to or larger than a thickness of the first heating wire.

Aspect 3.
The windshield according to Aspect 1 or 2, wherein the information acquisition region has an area not larger than 10000 mm$^2$.

Aspect 4.
The windshield according to any one of Aspects 1 to 3, wherein adjacent first heating wires of the first heating wires are not connected to each other.

Aspect 5.
The windshield according to any one of Aspects 1 to 4, wherein the information acquisition region is located within a distance of 200 mm from an edge of the outer glass plate.

Aspect 6.
The windshield according to any one of Aspects 1 to 5, wherein the plurality of first heating wires extend in an up-down direction.

Aspect 7.
The windshield according to any one of Aspects 1 to 6, wherein a pitch between the first heating wires is 0.3 to 10 mm.

Aspect 8.
The windshield according to any one of Aspects 1 to 7, wherein the heat generation layer further includes:
a first side bus bar of which at least a portion extends along an end portion on the first side;
a second side bus bar of which at least a portion extends along an end portion on the second side; and
a plurality of second heating wires that are arranged so as to connect the first side bus bar and the second side bus bar to each other.

Aspect 9.
The windshield according to Aspect 8, wherein one of the first side bus bar and the second side bus bar constitutes a single piece together with either of the bus bars that are arranged such that the information acquisition region is interposed therebetween.

Aspect 10.
The windshield according to Aspect 8 or 9, wherein the second heating wires are arranged in a view field region outside the information acquisition region, a heat generation amount per unit area of the information acquisition region is larger than a heat generation amount per unit area of the view field region, and the first heating wires have a smaller wire width than the second heating wires.

Aspect 11.

The windshield according to any one of Aspects 8 to 10, wherein a pitch between the first heating wires is smaller than a pitch between the second heating wires.

Advantageous Effects of Invention

With the windshield according to the present invention, heat can be generated such that information can be accurately acquired using the information acquisition device.

DESCRIPTION OF EMBODIMENTS

A. First Embodiment

Figure 1:
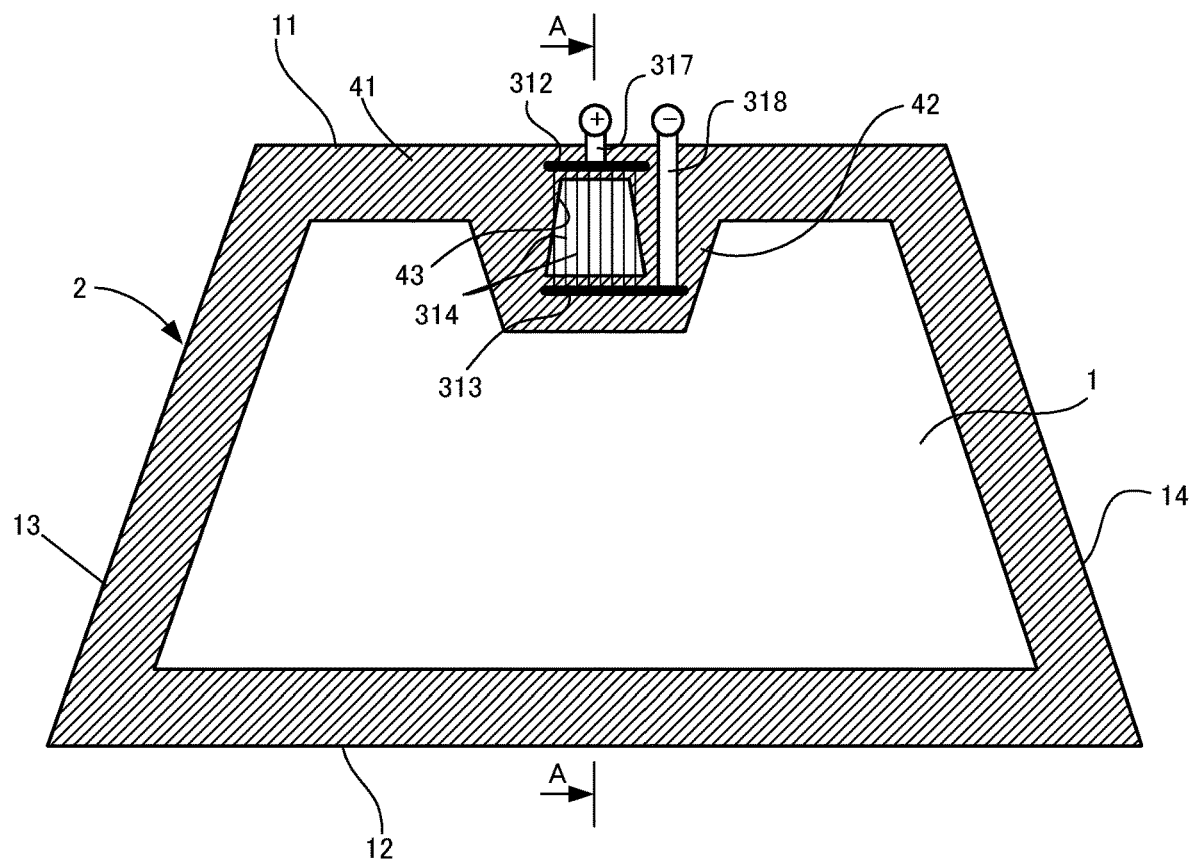
FIG. 1 is a front view of a windshield according to a first embodiment of the present invention.
Figure 2:
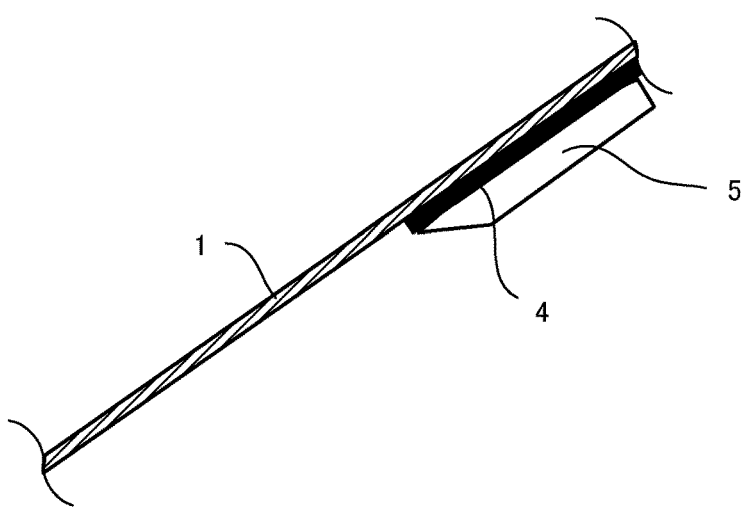
FIG. 2 is a cross-sectional view of the windshield shown in FIG. 1.
Figure 3:
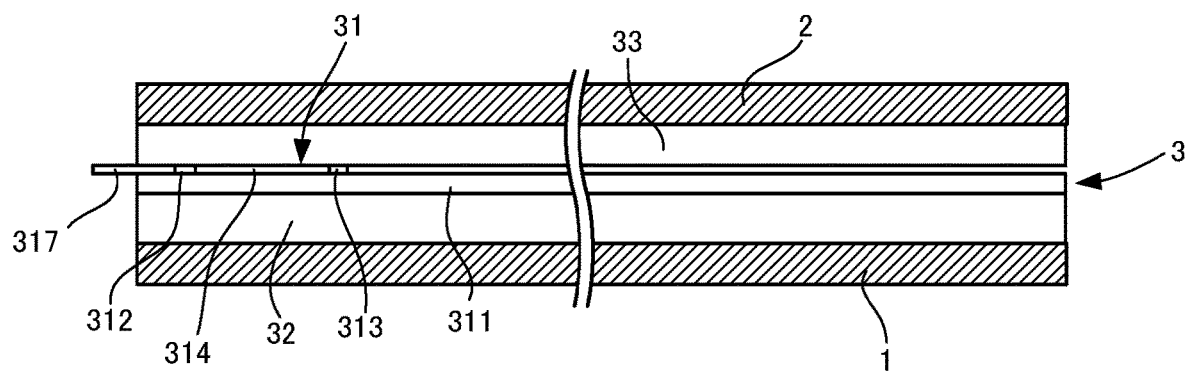
FIG. 3 is a cross-sectional view taken along line A-A in FIG. 1.

The following describes a first embodiment of a windshield according to the present invention with reference to the drawings. FIG. 1 is a plan view of the windshield according to the present embodiment, FIG. 2 is a cross-sectional view showing a state in which the windshield shown in FIG. 1 is attached to a vehicle, and FIG. 3 is a cross-sectional view taken along line A-A in FIG. 1. As shown in FIGS. 1 to 3, the windshield according to the present embodiment includes an outer glass plate 1, an inner glass plate 2, and an interlayer 3 that is arranged between these glass plates 1 and 2. Further, a mask layer 4 is layered on at least one of the outer glass plate 1 and the inner glass plate 2, and a measurement unit 5, such as a laser radar, that measures a distance between vehicles is attached to a position corresponding to the mask layer 4. The following describes respective members.

1. Summary of Windshield 1-1. Glass Plates

Each of the glass plates 1 and 2 is formed into a rectangular shape that includes a lower side 12 that is longer than an upper side 11. That is, each of the glass plates is formed into a trapezoidal shape surrounded by the upper side 11, the lower side 12, and two sides (a left side 13 and a right side 14). Known glass plates can be used as the glass plates 1 and 2, and these glass plates can be made of heat-ray absorbing glass, regular clear glass, green glass, or UV green glass. However, the glass plates 1 and 2 need to realize visible light transmittance that conforms to the safety standards of the country in which the automobile is to be used. For example, adjustments can be made so that the outer glass plate 1 ensures a required solar absorptance and the inner glass plate 2 provides visible light transmittance that meets safety standards. The following shows one example of compositions of clear glass, heat-ray absorbing glass, and soda lime-based glass.

Clear glass $SiO_2$: 70 to 73 mass %

$Al_2O_3$: 0.6 to 2.4 mass %

CaO: 7 to 12 mass %

MgO: 1.0 to 4.5 mass %

$R_2O$: 13 to 15 mass % (R is an alkali metal)

Total iron oxide ($T\text{-}Fe_2O_3$) in terms of $Fe_2O_3$: 0.08 to 0.14 mass %

Heat-Ray Absorbing Glass

With regard to the composition of heat-ray absorbing glass, a composition obtained, which is based on the composition of clear glass, by setting the ratio of the total iron oxide ($T\text{-}Fe_2O_3$) in terms of $Fe_2O_3$ to 0.4 to 1.3 mass %, the ratio of $CeO_2$ to 0 to 2 mass %, and the ratio of $TiO_2$ to 0 to 0.5 mass %, and reducing the components (mainly $SiO_2$ and $Al_2O_3$) forming the framework of glass by an amount corresponding to the increases in $T\text{-}Fe_2O_3$, $CeO_2$, and $TiO_2$ can be used, for example.

Soda lime-based glass
$SiO_2$: 65 to 80 mass %
$Al_2O_3$: 0 to 5 mass %
CaO: 5 to 15 mass %
MgO: at least 2 mass %
NaO: 10 to 18 mass %
$K_2O$: 0 to 5 mass %
MgO+CaO: 5 to 15 mass %
$Na_2O+K_2O$: 10 to 20 mass %
$SO_3$: 0.05 to 0.3 mass %
$B_2O_3$: 0 to 5 mass %
Total iron oxide ($T-Fe_2O_3$) in terms of $Fe_2O_3$: 0.02 to 0.03 mass %

As described above, each of the glass plates 1 and 2 is formed into a rectangular shape, but the ratio between the upper side 11 and the lower side 12 can be set to 1:1.04 to 1:1.5, for example. If the upper side has a length of 1200 mm, the length of the lower side can be set to 1250 to 1800 mm, for example. Specifically, the length of the upper side can be set to 1195 mm and the length of the lower side can be set to 1435 mm. Note that the above-described ratio is a ratio in a two-dimensional plane to which the windshield is projected from the front side.

That is, although FIG. 1 shows an example in which the lower side 12 is long, the present invention can also be applied to a windshield in which the upper side 11 is long. For example, in the case of a windshield of a compact car for one person, if the upper side has a length of 500 mm, the length of the lower side can be set to 350 to 450 mm. Specifically, the length of the upper side can be set to 500 mm and the length of the lower side can be set to 425 mm.

Although there is no particular limitation on the thickness of a laminated glass according to the present embodiment, the total thickness of the outer glass plate 1 and the inner glass plate 2 is preferably set to 2.4 to 4.6 mm, more preferably 2.6 to 3.4 mm, and particularly preferably 2.7 to 3.2 mm, from the viewpoint of weight reduction. As described above, it is necessary to reduce the total thickness of the outer glass plate 1 and the inner glass plate 2 in order to reduce the weight, and therefore, although there is no particular limitation on the thicknesses of the outer glass plate 1 and the inner glass plate 2, the thicknesses of these glass plates can be determined as described below, for example.

Durability against external damage and impact resistance are mainly required for the outer glass plate 1. For example, if the laminated glass is used as a windshield of an automobile, impact resistance against flying objects such as small stones is required. On the other hand, the weight increases as the thickness increases, which is not preferable. From this viewpoint, the thickness of the outer glass plate 1 is preferably 1.0 to 3.0 mm, and more preferably 1.6 to 2.3 mm. It is possible to determine the thickness to employ according to the use of the glass.

The thickness of the inner glass plate 2 can be made equal to the thickness of the outer glass plate 1, but in order to reduce the weight of the laminated glass, for example, the thickness of the inner glass plate 2 can be made smaller than that of the outer glass plate 1. Specifically, when the strength of the glass is taken into consideration, the thickness is preferably 0.6 to 2.0 mm, more preferably 0.8 to 1.8 mm, and particularly preferably 0.8 to 1.6 mm. The thickness is yet more preferably 0.8 to 1.3 mm. For the inner glass plate 2 as well, it is possible to determine the thickness to employ according to the use of the glass.

Note that if heating wires 314 included in the interlayer 3, which will be described later, are arranged at the center of the interlayer 3 in the thickness direction, the thicknesses of the glass plates 1 and 2 may also be made different from each other. Which glass plate is made thicker depends on the main use of the heating wires 314.

The outer glass plate 1 and the inner glass plate 2 according to the present embodiment may also have curved shapes. However, it is supposed that, if each of the glass plates 1 and 2 has a curved shape, the larger the depth of bend is, the lower the sound insulation performance is. The depth of bend is an amount indicating the bend of a glass plate, and when a straight line L connecting the center of an upper side and the center of a lower side of the glass plate is set, the greatest distance between this straight line L and the glass plate is defined as the depth of bend D.

Also, a glass plate having a curved shape does not have a large difference in sound transmission loss (STL) if the depth of bend D is within a range of 30 to 38 mm, but it can be found that the sound transmission loss is reduced in a frequency band of 4000 Hz or lower when compared to a glass plate having a flat shape. Therefore, a smaller depth of bend D is preferable when a glass plate having a curved shape is manufactured. Specifically, the depth of bend D is preferably smaller than 30 mm, more preferably smaller than 25 mm, and particularly preferably smaller than 20 mm.

Here, one example of a method for measuring the thickness of a curved glass plate will be described. First, with respect to the measurement position, the measurement is performed at two positions: an upper position and a lower position on a center line extending in the up-down direction at the center of the glass plate in the left-right direction. Although there is no particular limitation on the measurement device, a thickness gauge such as SM-112 manufactured by TECLOCK Co., Ltd. can be used, for example. During measurement, the glass plate is arranged such that its curved surface is placed on a flat surface, and an end portion of the glass plate is sandwiched and measured with the above-described thickness gauge.

1-2. Mask Layer

As shown in FIGS. 1 to 3, the mask layer 4 that is formed using ceramic of a dark color such as black is layered on a peripheral edge of the windshield. The mask layer 4 is for blocking the view from the inside or the outside of the vehicle, and includes a peripheral portion 41 that is layered along the four sides 11 to 14 of the windshield and a center portion 42 that extends downward from the vicinity of the center of a portion of the peripheral portion 41 that corresponds to the upper side of the windshield 11. A rectangular window portion 43 is formed in the center portion 43. The window portion 43 is a portion in which the mask layer 4 is not formed and through which the inside and the outside of the windshield can be seen. The above-described measurement unit 5 is arranged on the vehicle interior side and is configured to acquire information from the outside of the vehicle via the window portion 43. Note that although there is no particular limitation on the size of the window portion 43, the size can be set to be not larger than 10000 $mm^2$, for example. Also, the window portion 43 can be arranged on the lower side of the upper side of the windshield within a distance of 200 mm from the upper side, for example.

Various configurations can be employed for the mask layer 4, for example, the mask layer 4 can be provided only on an inner surface of the outer glass plate 1 or an inner surface of the inner glass plate 2, or can be provided on both the inner surface of the outer glass plate 1 and the inner surface of the inner glass plate 2. Although FIG. 2 shows one example in which the mask layer 4 is arranged on the inner surface of the inner glass plate 2, the mask layer 4 is omitted in FIG. 3. Although ceramic and various materials can be used for the mask layer 4, the mask layer can have the following composition, for example.

TABLE 1

|  |  | First and second colored ceramic paste |
|---|---|---|
| Pigment *1 | mass % | 20 |
| Resin (cellulose resin) | mass % | 10 |
| Organic solvent (pine oil) | mass % | 10 |
| Glass binder *2 | mass % | 65 |
| Viscosity | dPs | 150 |

*1 Main components: copper oxide, chromium oxide, iron oxide, and manganese oxide
*2 Main components: bismuth borosilicate and zinc borosilicate Although a ceramic layer can be formed using a screen printing process, the layer can alternatively be produced by transferring a transfer film for firing to the glass plate and firing it. If screen printing is employed, the ceramic layer can be formed under the conditions that a polyester screen of 355 mesh is used, the coating thickness is 20 μm, the tension is 20 Nm, the squeegee hardness is 80 degrees, the attachment angle is 75°, and the printing speed is 300 mm/s, and performing drying in a drying furnace at 150° C. for 10 minutes, for example.

Alternatively, the mask layer 4 can be formed by attaching a blocking film that is made of a dark colored resin, instead of laminating ceramic.

1-3. Interlayer

Next, the interlayer 3 will be described. The interlayer 3 is constituted by three layers, i.e., a heat generation layer 31 and a pair of adhesive layers 32 and 33 that sandwich the heat generation layer 31. In the following description, an adhesive layer arranged on the outer glass plate 1 side will be referred to as a first adhesive layer 32 and an adhesive layer arranged on the inner glass plate 2 side will be referred to as a second adhesive layer 33.

1-3-1. Heat Generation Layer

First, the heat generation layer 31 will be described. The heat generation layer 31 is for heating a region (information acquisition region) that corresponds to the window portion 43 of the mask layer 4 in each of the glass plates 1 and 2 to melt frost or remove fog. Specifically, the heat generation layer includes a sheet-shaped base material 311, a first bus bar 312, a second bus bar 313, and a plurality of heating wires 314, the bus bars and the heating wires being arranged on the base material 311. The base material 311 may have the same size as the glass plates 1 and 2, but may also be arranged only in a region that corresponds to the center portion 42 of the mask layer 4. Alternatively, a configuration is also possible in which the base material 311 is smaller than the adhesive layers 32 and 33 and a peripheral portion of the base material 311 is arranged inward of peripheral portions of the adhesive layers 32 and 33. The first bus bar 312, the second bus bar 313, and the plurality of heating wires 314 are arranged at positions corresponding to the center portion 42 of the mask layer 4, and in particular, the plurality of heating wires 314 are arranged side by side across the window portion 43. A specific configuration will be described below.

As shown in FIG. 1, the first bus bar 312 is formed into a band shape and extends along an upper side of the above-described window portion 43, and the second bus bar 313 is formed into a band shape and extends along a lower side of the window portion 43. The second bus bar 313 is formed so as to slightly protrude rightward from the lower side of the window portion 43. The plurality of heating wires 314 are connected in parallel while extending in the up-down direction, with the bus bars 312 and 313 serving as electrodes. Further, a band-shaped first connection member 317 is connected to a left end portion of the first bus bar 312, and a band-shaped second connection member 318 is connected to a right end portion of the second bus bar. The first connection member 317 and the second connection member 318 are for connecting the bus bars 312 and 313 to connection terminals (a positive electrode terminal and a negative electrode terminal, not shown) and formed into sheet shapes using an electrically-conductive material. Therefore, the connection members 317 and 318 extend upward toward the upper side of the windshield and are respectively connected to a connection terminal of a positive electrode and a connection terminal of a negative electrode. A power supply voltage of 10 to 50 V is applied to these connection terminals, for example.

Note that the connection members 317 and 318 are respectively sandwiched between the first bus bar 312 and the second adhesive layer 33 and between the second bus bar 313 and the second adhesive layer 33. The connection members 317 and 318 are respectively fixed to the bus bars 312 and 313 using a fixing material such as solder. It is preferable to use solder that has a low melting point not higher than 150° C., for example, as the fixing material so that fixing can be performed using an autoclave at the same time when the windshield is assembled as described later. However, another connection method may also be used.

The width of each of the bus bars 312 and 313 in the up-down direction is preferably 5 to 50 mm, and more preferably 10 to 30 mm, for example. If the width of the bus bars 312 and 313 is smaller than 5 mm, the heat generation amount of the bus bars increases, and consequently the heat generation amount of the heating wires 314 decreases and a desired heat generation amount cannot be obtained. On the other hand, if the width of the bus bars 312 and 313 is larger than 50 mm, there is a risk that the bus bars 312 and 313 may obstruct the view. Each of the bus bars 312 and 313 need not be formed so as to extend exactly along the base material 311. That is, the bus bars need not be completely parallel to edges of the base material 311, and may also be curved.

Next, the heating wires 314 will be described. Snow, frost, and fog on a surface of the window portion 43 are removed as a result of heat being generated by the heating wires 314. Therefore, the heating wires 314 are required to have a heat generation amount that is large enough to melt frost or the like, but on the other hand, it is necessary to keep the heating wires 314 from inhibiting the passage of light in order to acquire information from the outside of the vehicle via the window portion 43 using the measurement unit 5, which will be described later. Therefore, the heat generation amount, dimensions such as the wire width and the pitch, and the like of the heating wires 314 are set in the present embodiment as described below.

The heat generation amount of the heating wires 314 can be calculated using the following Expression (1). Further, a relationship between the resistance of the heating wires 314 and the length and the cross-sectional area of the heating wires 3314 is as shown in Expression (2).

$$W = IV = RI^2 = V^2/R \tag{1}$$

$$R = \rho(L/A) \tag{2}$$

W: power, E: voltage, I: current, R: resistance, L: length, A: cross-sectional area, ρ: electrical resistivity According to the above Expressions (1) and (2), the heat generation amount of the heating wires 314 can be increased by, for example, reducing the resistance R, reducing the length L of the heating wires 314, increasing the cross-sectional area A of the heating wires 314, or reducing the electrical resistivity p. Also, the heat generation amount at the window portion 43 can be increased by increasing the number of heating wires 314 to increase a total cross-sectional area A. The following describes the heating wires 314 in view of the foregoing.

The plurality of heating wires 314 are formed so as to extend in the up-down direction and connect the bus bars 312 and 313 to each other. Each of the heating wires 314 can be formed into a straight line shape or various shapes such as a wave shape. In particular, if each of the heating wires 314 is formed into a sine wave shape, heat can be uniformly distributed and the heating wires 314 can be kept from optically obstructing a view field of the windshield. At this time, the crimp ratio of the heating wires 314 can be set to 150% or less, for example. The crimp ratio is the ratio of an actual length of each heating wire 314 (the length measured along a curved line) to a length between both ends of the heating wire 314 on the heat generation layer 31.

The wire width of each heating wire 314 is preferably 1 to 10 μm, and more preferably 1 to 8 μm. The wire width is even more preferably 1 to 5 μm. Heating wires having a smaller wire width such as a wire width not larger than 10 μm are less likely to be seen, and therefore are suitable for use in the window portion 43 through which light emitted from a sensor passes as is the case with the present embodiment. Also, the smaller the wire width is, the smaller the thickness of the heating wires 314 needs to be made as described later, and consequently the cross-sectional area of the heating wires 314 is reduced and the heat generation amount is increased. On the other hand, if the wire width is too small, there is a risk that the heating wires cannot be manufactured or the heat generation amount will be too large. Note that the wire width refers to the largest wire width of a cross-sectional shape of the heating wires 314. If the cross-sectional shape of the heating wires 314 is a trapezoid, for example, the length of the lower side is the wire width, and if the cross-sectional shape of the heating wires 314 is a circle, the diameter is the wire width. The width of the heating wires 314 can be measured using a microscope such as VHX-200 (manufactured by Keyence Corporation) at 1000× magnification, for example.

The wire width of the heating wires 314 need not be constant and may also be varied. For example, the heating wires can be formed so as to become gradually narrow or thick downward. Alternatively, the wire width may also be varied between different regions. For example, the wire width may be varied between an upper portion and a lower portion of the heating wires 314. Such a variation of the wire width can be applied to an arrangement in which the pitch between the heating wires 314 varies, for example. In a case in which the plurality of heating wires 314 are arranged in a trapezoidal window portion 43, for example, if the pitch between the heating wires 314 increases downward, the wire width of the heating wires 314 can be reduced downward.

The thickness of each heating wire 314 is preferably not larger than the wire width. In other words, the aspect ratio of a cross section of each heating wire 314 is preferably not larger than 1. If the thickness of the heating wires 314 is larger than the wire width, the heating wires 314 may fall over on the base material 311, for example, giving rise to a difficulty in manufacture, or there is a risk of breaking of the heating wires.

Although there is no particular limitation on the lower limit of the pitch between adjacent heating wires 314, the pitch is preferably 0.3 to 6 mm, and more preferably 1.25 to 4 mm, for example. If the pitch is small, there is a risk that acquisition of information performed using the measurement unit may be inhibited, and if the pitch is large, there is a risk that the window portion cannot be sufficiently heated. In view of this, it is preferable to set the pitch between the heating wires as described above. Note that the pitch is a length that is obtained by adding the wire width of a heating wire 314 to the length of a space between adjacent heating wires 314, rather than the length of the space between adjacent heating wires 314. If the heating wires 314 have a sine wave shape, the distance between center lines of the heating wires 314 is the pitch between the heating wires 314.

When a voltage of 13.5 V is applied between the bus bars 312 and 313, for example, the heat generation amount per unit length of each heating wire 314 is preferably not larger than 2.0 W/m, more preferably not larger than 1.5 W/m, and particularly preferably not larger than 1.0 W/m. In order to effectively melt frost or the like using such heating wires 314, the heat generation amount per unit area of the window portion 43 is preferably at least 400 W/m$^2$, more preferably at least 600 W/m$^2$, and particularly preferably at least 1000 W/m$^2$.

Figure 4:
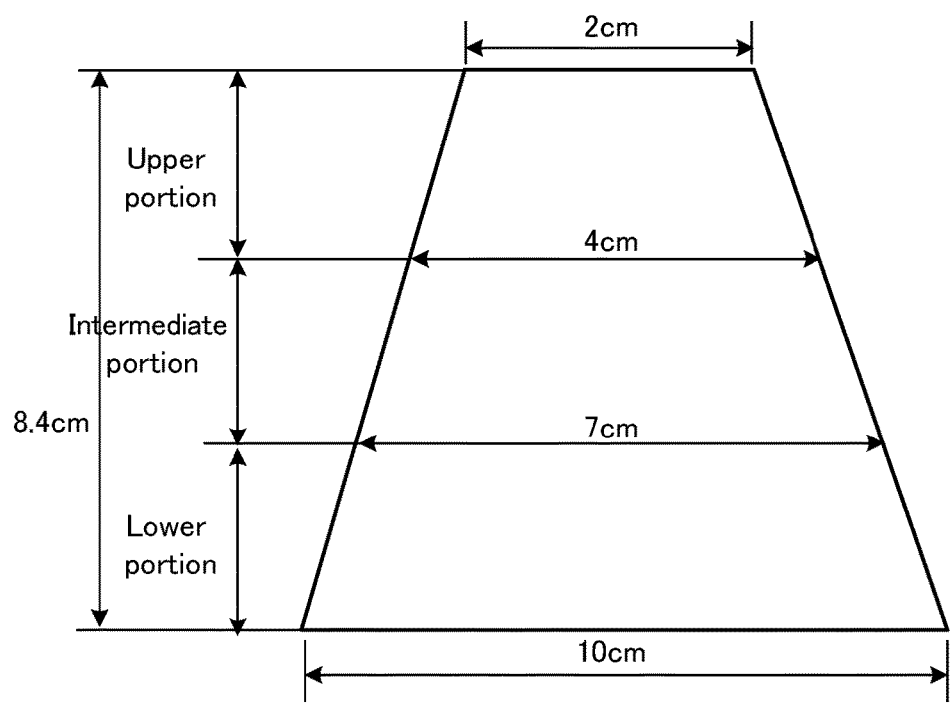
FIG. 4 is a plan view showing one example of a window portion of a mask layer.

The following shows one example of specifications of the heating wires 314 arranged in the window portion 314 such as that shown in FIG. 4.

TABLE 2

| | |
|---|---|
| Heat generation amount | 2000 W/m$^2$ |
| Power | 10 W |
| Resistance | 18.7 Ω |
| Area of window portion | 0.0049 m$^2$ (upper side: 2 cm, lower side: 10 cm, height: 8.4 cm) |
| Voltage | 13.5 V |
| Wire width of heating wires | upper portion: 8.11 μm, intermediate portion: 4.38 μm, lower portion: 3.0 μm |
| Height of heating wires | 2 μm |
| Pitch between heating wires | Upper portion: 3.45 mm, intermediate portion: 5.51 mm, lower portion: 7.57 mm |
| The number of heating wires | 13 |
| Length of heating wires | 10.2 cm |
| Crimp ratio | 120% |

Next, materials of the heat generation layer 31 will be described. The base material 311 is a transparent film that supports the bus bars 312 and 313 and the heating wires 314. Although there is no particular limitation on the material of the base material 311, the base material 311 can be made of polyethylene terephthalate, polyethylene, polymethyl methacrylate, polyvinyl chloride, polyester, polyolefin, polycarbonate, polystyrene, polypropylene, nylon, or the like, for example. Alternatively, the base material can also be made of a polyvinyl butyral resin (PVB), ethylene vinyl acetate (EVA), or the like. The bus bars 312 and 313 and the heating wires 314 can be made of the same material, and can be made of various materials such as copper (or tin-plated copper), gold, aluminum, magnesium, cobalt, tungsten, silver, or an alloy of any of these metals. Among these, silver, copper, gold, and aluminum, each of which has an electrical resistivity not larger than 3.0×10$^{-8}$ Ωm, are preferably used.

Next, a method for forming the bus bars 312 and 313 and the heating wires 314 will be described. The bus bars 312 and 313 and the heating wires 314 can be formed by arranging thin wires or the like formed in advance on the base material 311, but in order to make the wire width of the heating wires 314 smaller, the heating wires 314 can be formed by forming a pattern on the base material 311. There is no particular limitation on the method for forming the pattern, and the pattern can be formed using various methods such as printing, etching, and transferring. At this time, the bus bars 312 and 313 and the heating wires 314 can be formed separately or as a single piece. Note that materials being formed "as a single piece" means that the materials are continuous to each other (i.e., seamless) and there is no interface between the materials.

It is also possible to form the bus bars 312 and 313 on the base material 311 and remove portions of the base material 311 corresponding to the bus bars 312 and 313, while leaving a portion of the base material 311 for the heating wires 314. Thereafter, the heating wires 314 can be arranged on the base material 311 between the bus bars 312 and 313.

In particular, etching can be performed using the following process, for example. First, dry lamination of metal foil is performed on the base material 311 via a primer layer. Copper foil can be used as the metal foil, for example. A pattern of the bus bars 312 and 313 and the plurality of heating wires 314 can be formed as a single piece on the base material 311 by performing chemical etching on the metal foil using photolithography. In particular, in a case in which the wire width of the heating wires 314 is made small, as is the case with the present embodiment, thin metal foil is preferably used, and it is possible to form a thin metal layer (e.g., 5 µm or less) on the base material 311 through deposition, sputtering, or the like, and thereafter perform patterning using photolithography. Note that surfaces of the heating wires 314, i.e., surfaces on the inner glass plate 2 side can also be made black to make the heating wires 314 less visible from the vehicle interior side. The heating wires can be made black through plating using a material such as copper nitride, copper oxide, nickel nitride, or nickel chromium.

1-3-2. Adhesive Layer

The adhesive layers 32 and 33 are sheet-shaped members that sandwich the heat generation layer 31 and are bonded to the glass plates 1 and 2. The adhesive layers 32 and 33 have the same size as the glass plates 1 and 2. Although these adhesive layers 32 and 33 can be formed using various materials, the adhesive layers can be formed using a polyvinyl butyral resin (PVB), ethylene vinyl acetate (EVA), or the like. In particular, polyvinyl butyral resin has good adhesion to the glass plates and also has good penetration resistance, and therefore is preferable. Note that layers of a surfactant may also be provided between the heat generation layer 31 and the adhesive layers 32 and 33. With use of such a surfactant, surfaces of the layers can be modified to improve adhesive force. Although the adhesive layers 32 and 33 have the same size as the glass plates 1 and 2, the heat generation layer 31 need not have the same size as the adhesive layers 32 and 33, and can also be made small as described above.

1-3-3. Thickness of Interlayer

The total thickness of the interlayer 3 is not particularly specified, but is preferably 0.3 to 6.0 mm, more preferably 0.5 to 4.0 mm, and particularly preferably 0.6 to 2.0 mm. The thickness of the base material 311 of the heat generation layer 31 is preferably 5 to 200 mm, and more preferably 5 to 100 mm. On the other hand, the thickness of each of the adhesive layers 32 and 33 is preferably larger than the thickness of the heat generation layer 31, specifically, preferably 0.1 to 2.0 mm, and more preferably 0.1 to 1.0 mm. The thicknesses of the adhesive layers 32 and 33 may be the same as or different from each other. In order to make the second adhesive layer 33 and the base material 311 be in close contact with each other, the thickness of the bus bars 312 and 313 and the heating wires 314, which are sandwiched between the second adhesive layer 33 and the base material 311, is preferably 3 to 20 µm.

The thicknesses of the heat generation layer 31 and the adhesive layers 32 and 33 can be measured as described below, for example. First, a cross section of the laminated glass is enlarged by a factor of 175 and displayed using a microscope (e.g., VH-5500 manufactured by Keyence Corporation). Then, the thicknesses of the heat generation layer 31 and the adhesive layers 32 and 33 are visually identified and measured. At this time, in order to eliminate variations seen in visual identification, measurement is performed five times, and an average value is taken as the thickness of the heat generation layer 31 or the adhesive layer 32 or 33.

Note that the thicknesses of the heat generation layer 31 and the adhesive layers 32 and 33 of the interlayer 3 are not required to be constant over the entire surface. For example, the heat generation layer 31 and the adhesive layers 32 and 33 can also have a wedge shape suited to a laminated glass that is used for a head-up display. In this case, the thicknesses of the heat generation layer 31 and the adhesive layers 32 and 33 of the interlayer 3 are measured at a position with the smallest thicknesses, i.e., in the lowest side portion of the laminated glass. If the interlayer 3 has a wedge shape, the outer glass plate 1 and the inner glass plate 2 are not arranged in parallel, but it should be construed that such an arrangement is also included in the glass plates in the present invention. That is, the present invention includes the arrangement of the outer glass plate 1 and the inner glass plate 2 when the interlayer 3 that includes the heat generation layer 31 and the adhesive layers 32 and 33 whose thicknesses increase at a rate of change of 3 mm or less per meter is used, for example.

2. Measurement Unit

Next, the measurement unit will be described with reference to FIG. 2. The measurement unit 5 is constituted by a bracket (not shown) that is fixed to the inner surface of the inner glass plate 2, a sensor (information acquisition device, not shown) that is supported by the bracket, and a cover (not shown) that covers the bracket and the sensor from the vehicle interior side. Note that the sensor is supported by the bracket fixed to the inner glass plate 2 and is not in contact with the inner glass plate 2. Accordingly, it can be said that the sensor is arranged in the vicinity of the inner glass plate 2.

An opening is formed in the bracket, and the sensor is configured to emit light and receive light from the window portion 43 of the mask layer 4 via the opening.

After a non-illustrated harness or the like is attached, the cover is attached to the bracket from the vehicle interior side. As a result, the sensor and the bracket cannot be seen from the vehicle interior side. Note that the measurement unit 4 cannot be seen from the vehicle exterior side except through the window portion 43 as a result of the center portion 42 of the mask layer 4 being provided.

In such a measurement unit, pulses of laser light are emitted from the sensor. A distance from the self-vehicle to a preceding vehicle or an obstacle is calculated based on a time it takes to receive the laser light reflected from the preceding vehicle or the obstacle. The calculated distance is transmitted to an external device and used to control a brake or the like.

3. Method for Manufacturing Windshield

Next, a method for manufacturing the windshield will be described. First, a manufacturing line of the glass plates will be described.

Figure 5:
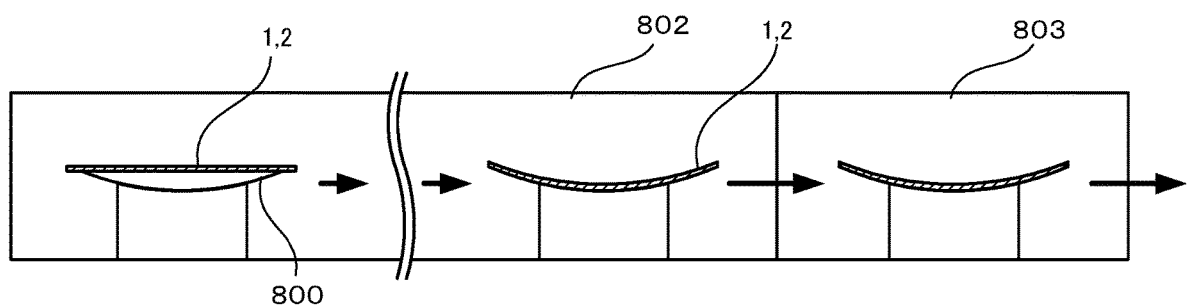
FIG. 5 is a side view (a) of furnaces through which a mold passes and a plan view (b) of the mold.
Figure 5:
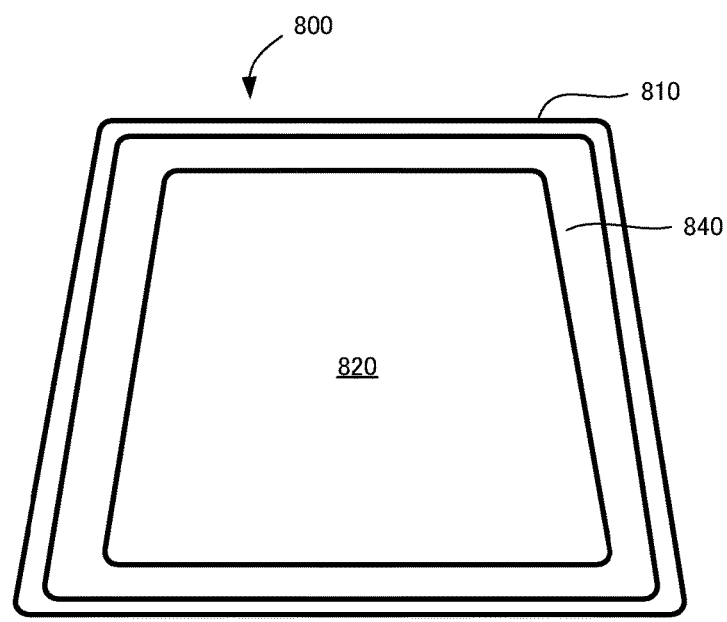

Here, a mold will be described in detail with reference to FIG. 5. FIG. 5(a) is a side view of furnaces through which the mold passes and FIG. 5(b) is a plan view of the mold. As shown in FIG. 5(b), a mold 800 includes a mold main body 810 having the shape of a frame that mostly matches the external forms of the glass plates 1 and 2. Since this mold main body 810 has the shape of a frame, there is an interior space 820 that vertically penetrates the inner side of the mold main body. Peripheral portions of the glass plates 1 and 2 each having a flat plate shape are placed on an upper surface of the mold main body 810. Accordingly, heat is applied to the glass plates 1 and 2 via the interior space 820 by a heater (not shown) that is arranged below the glass plates. When heat is applied, the glass plates 1 and 2 soften and curve downward under their own weight. In some cases, a shield plate 840 for shielding the glass plates from heat is arranged on an inner peripheral edge of the mold main body 810 to enable adjustment of heat applied to the glass plates 1 and 2. The heater can be arranged above the mold 800 as well as below the mold.

After the above-described shield layer 7 is layered on the outer glass plate 1 and the inner glass plate 2 having the flat plate shape, the outer glass plate 1 and the inner glass plate 2 are superimposed and passed through a heating furnace 802 in a state of being supported by the above-described mold 800 as shown in FIG. 5(a). When the glass plates 1 and 2 are heated to around the softening point in the heating furnace 802, portions of the glass plates inward of peripheral portions curve downward under their own weight and thus the glass plates are molded into a curved shape. Subsequently, the glass plates 1 and 2 are conveyed from the heating furnace 802 to an annealing furnace 803 to be subjected to annealing treatment. Thereafter, the glass plates 1 and 2 are conveyed out of the annealing furnace 803 and cooled.

After the outer glass plate 1 and the inner glass plate 2 are molded as described above, subsequently, the interlayer 3 is sandwiched between the outer glass plate 1 and the inner glass plate 2. Specifically, first, the outer glass plate 1, the first adhesive layer 32, the heat generation layer 31, the second adhesive layer 33, and the inner glass plate 2 are layered in that order. At this time, the heat generation layer 31 is arranged such that a surface of the heat generation layer 31 on which the first bus bar 312 and the like are formed faces the second adhesive layer 33 side. Next, the connection members 317 and 318 are inserted between the heat generation layer 31 and the second adhesive layer 33 from cutouts 21 and 22. At this time, solder that has a low melting point and serves as a fixing material is applied to the connection members 317 and 318 and is arranged on the bus bars 312 and 313.

The resultant laminate including the glass plates 1 and 2, the interlayer 3, and the connection members 317 and 318 is placed into a rubber bag and preliminarily bonded together at about 70 to 110° C. under vacuum suction. Preliminary bonding can be performed using another method, and the following method can also be employed. For example, the above-described laminate is heated at 45 to 65° C. in an oven. Next, this laminate is pressed by a roller at 0.45 to 0.55 MPa. Subsequently, this laminate is again heated at 80 to 105° C. in an oven and thereafter again pressed by a roller at 0.45 to 0.55 MPa. Thus, preliminary bonding is finished.

Next, permanent bonding is performed. The preliminarily bonded laminate is permanently bonded using an autoclave at a pressure of 8 to 15 atmospheres and at 100 to 150° C., for example. Specifically, permanent bonding can be performed under the conditions of a pressure of 14 atmospheres and 135° C., for example. Through the above-described preliminary boding and permanent bonding, the adhesive layers 32 and 33 are bonded to the glass plates 1 and 2 in a state of sandwiching the heat generation layer 31. Also, the solder on the connection members 317 and 318 is molten and the connection members 317 and 318 are respectively fixed to the bus bars 312 and 313. Thus, a laminated glass according to the present embodiment is manufactured. Note that a curved windshield can also be manufactured using another method, for example, pressing.

4. Method for Using Windshield

The windshield configured as described above is attached to a vehicle body and connection terminals are fixed to the connection members 317 and 318. When electricity is passed through the connection terminals, a current is applied to the heating wires 314 via the connection members 317 and 318 and the bus bars 312 and 313, and heat is generated. By generating heat as described above, it is possible to remove fog from a vehicle interior side surface of the window portion 43 or melt frost on a vehicle exterior side surface of the window portion 43. Accordingly, when light is received or emitted by the sensor, light can be kept from being interrupted by fog or the like in the window portion 43. As a result, measurement can be accurately performed using the sensor.

5. Characteristics

As described above, the following effects can be achieved according to the present embodiment.

(1) The wire width of the heating wires 314 arranged in the window portion 43 is not larger than 10 μm and is extremely small, and therefore emission and reception of light performed by the sensor can be prevented from being inhibited. Also, the heating wires are unlikely to be seen from the outside.

(2) A large number of heating wires 314 can be arranged in the window portion 43 as a result of the heating wires 314 having a small wire width as described above and being arranged at a pitch as small as 0.3 to 6 mm. Therefore, the window portion 43 can be uniformly heated, and even if the heat generation amount of each heating wire 314 is small, a desired heat generation amount (heat generation amount per unit area) can be achieved with the entire window portion 43.

(3) It is necessary to accurately acquire information from the outside of the vehicle using the measurement unit 5 in regions of the glass plates 1 and 2 that correspond to the window portion 43, and therefore these regions are desired to have higher frost melting performance and higher anti-fogging performance owing to the heating wires 314, when compared to other regions. Here, although a large heat generation amount is required to improve the frost melting performance and the like of the heating wires 314, even if the heat generation amount of a region surrounded by the window portion 43 is increased, the increase does not pose a big problem in terms of power consumption because the region has a small area e.g., 10000 mm$^2$ or less. On the other hand, the heat generation amount is reduced in the present embodiment by setting the wire width of each heating wire 314 to be as small as 10 μm or less according to the above Expressions (1) and (2). Reasons for this are as follows.

That is, the frost melting performance and the anti-fogging performance in the window portion 43 are important to such an extent as to affect measurement performance of the measurement unit 5, and if the heat generation amount of each heating wire 314 is large, for example, there is a risk that heat generation distribution in the window portion 43 may become uneven due to breaking of some of the heating wires 314. In contrast, if the heat generation amount of each heating wire 314 is small, even if some of the heating wires 314 are broken, heat generation distribution can be kept substantially even and the frost melting performance and the anti-fogging performance in the window portion 43 can be kept uniform. As a result, information can be accurately acquired from the outside of the vehicle using the measurement unit 5. Uneven heat generation distribution due to breaking of heating wires can be further prevented by reducing the pitch between the heating wires 314 as described above.

(4) The heating wires 314 are not connected to each other via a bridge or the like, and therefore it is possible to suppress a situation in which heat is locally generated when a heating wire is broken. That is, in the present embodiment, as many as possible heating wires 314 are arranged in the window portion having a small area 43 so that a problem is unlikely to occur even if some of the heating wires are broken, and accordingly, abridge need not be provided. Therefore, the cost can be reduced.

(5) The heating wires 314 are arranged so as to extend in the up-down direction. If the heating wires 314 are arranged in parallel in the horizontal direction, for example, an apparent pitch between the heating wires is reduced because the windshield is inclined, and this may affect light emitted from the window portion 43 and light entering the window portion 43. In contrast, in the present embodiment, the heating wires 314 are arranged so as to extend in the up-down direction, and therefore such a problem does not occur.

B. Second Embodiment

Next, a second embodiment of a windshield according to the present invention will be described. The present embodiment differs from the first embodiment in that bus bars and heating wires are also arranged in a view field region other than the above-described window portion 43, in the heat generation layer 31 of the intermediate film 3. The view field region of the windshield is heated using these heating wires to melt frost or remove fog. In the following description, heating wires arranged in the window portion 43 will be referred to as first heating wires for the sake of convenience of description. Also, configurations for heating the window portion 43, such as the first heating wires 314 and the first and second bus bars 312 and 313, will be referred to as a first heat generation portion, and configurations such as the heating wires for generating heat in the view field region of the windshield other than the window portion 43 will be referred to as a second heat generation portion.

1. Aspect of Heat Generation Layer

Figure 6:
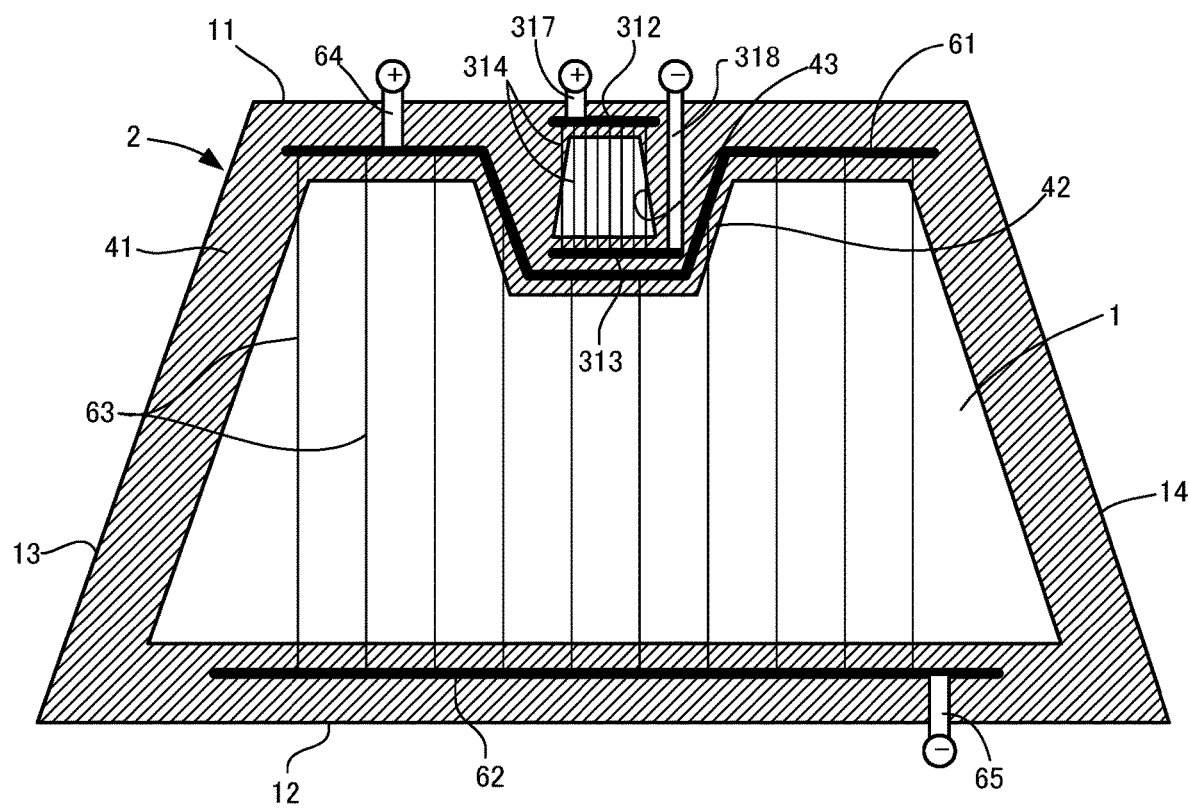
FIG. 6 is a plan view of a windshield according to a second embodiment of the present invention.

As shown in FIG. 6, the heat generation layer 31 according to the present embodiment has a size that mostly covers the entire glass plates and further includes a third bus bar (first side bus bar) 61 that is arranged along the upper side 11 of the windshield, a fourth bus bar (second side bus bar) 662 that is arranged along the lower side 12 of the windshield, and a plurality of second heating wires 63 that extend in the up-down direction so as to connect the third bus bar 61 and the fourth bus bar 62 to each other, the third bus bar, the fourth bus bar, and the second heating wires being provided on the base material 31 of the heat generation layer 31. The third bus bar 61 is formed so as to pass through the peripheral portion 41 and the center portion 42 of the mask layer 4 in the upper side 11 portion of the windshield. In particular, a portion of the third bus bar in the vicinity of its center in the left-right direction is formed so as to pass through the peripheral portion 41, a side edge of the center portion 42, and below the window portion 43. On the other hand, the fourth bus bar is formed so as to pass through the peripheral portion 41 of the mask layer 4 in the lower side 12 portion of the windshield. Further, a third connection member 64 is attached to a left end portion of the third bus bar 61, and a fourth connection member 65 is attached to a right end portion of the fourth bus bar 62. These connection members 64 and 65 are configured similarly to the first connection member 317 and the second connection member 318 described above. Note that the base material 311 of the heat generation layer 31 can be made smaller than the adhesive layers 32 and 33.

The plurality of second heating wires 63 are formed parallel to each other so as to extend in the up-down direction, but second heating wires 63 in the vicinity of the center in the left-right direction are made shorter than the other second heating wires 63 because the center portion 42 of the mask layer 4 protrudes downward. The second heating wires 63 can be formed into a straight line shape or a wave shape similarly to the first heating wires 314. The crimp ratio and the like are also as described above.

Incidentally, snow, frost, and fog generated on the surface of the windshield are removed using the plurality of second heating wires 63. On the other hand, as a result of heat being generated by the heating wires 63, the adhesive layers 32 and 33 and the like located in the surrounding region of the heating wires 63 are heated, and this may cause flickering when the outside of the vehicle is viewed through the windshield. In particular, studies made by the inventor of the present invention revealed that the temperature of the heating wires 63 and the surrounding region of the heating wires 63 needs to be controlled to be not higher than 60° C. to prevent the occurrence of flickering when the outside of the vehicle is viewed through the windshield. To realize this, the heat generation amount of the heating wires 63 needs to be reduced to some extent. As described above, the heating wires 63 in the second heat generation portion are required to prevent flickering while having a heat generation amount that is large enough to melt frost or the like, and therefore in the present embodiment, the heat generation amount, dimensions such as the wire width and the pitch, and the like of the second heating wires 63 are set as described below based on the above-described Expressions (1) and (2).

The wire width of each heating wire 63 is preferably 1 to 30 μm, more preferably 5 to 20 μm, and particularly preferably 8 to 15 μm. Heating wires 63 having a smaller wire width are less likely to be seen, and therefore are suitable for use in the windshield according to the present embodiment. However, if the width of the heating wires 63 is reduced, the cross-sectional area is reduced, and accordingly, the heat generation amount may be increased as described above. Therefore, the lower limit of the wire width of the heating wires 63 can be set as described above. On the other hand, if the wire width of the heating wires 63 is increased, the heating wires 63 are likely to be seen and the heat generation amount is reduced as a result of the cross-sectional area being increased. Therefore, the upper limit of the wire width of the heating wires 63 is set as described above.

However, the wire width can also be set as described below, depending on the voltage applied between the bus bars 61 and 62. If the voltage is smaller than 20 V, for example, the wire width of the heating wires 63 is preferably 9 to 20 µm. The heat generation amount can be increased by setting the wire width to be at least 9 µm. On the other hand, visibility can be reduced by setting the wire width to be not larger than 20 µm.

If the voltage applied between the bus bars 61 and 62 is 20 to 50 V, the wire width is preferably 1 to 10 µm. The heat generation amount can be increased by setting the wire width to be at least 1 µm. On the other hand, visibility can be reduced by setting the wire width to be not larger than 10 µm. Note that the wire width refers to the largest wire width of a cross-sectional shape of the heating wires 63. If the cross-sectional shape of the heating wires 63 is a trapezoid, for example, the length of the lower side is the wire width, and if the cross-sectional shape of the heating wires 63 is a circle, the diameter is the wire width.

The thickness of the heating wires 63 is preferably not larger than 30 µm, more preferably not larger than 20 µm, and particularly preferably not larger than 10 µm. If the thickness is small as described above, steps between the heating wires 63 and the base material 311 can be made small to suppress the formation of bubbles in the vicinity of the steps during manufacture as described later. Also, the thickness of the heating wires 63 is preferably smaller than the wire width of the heating wires 63. In other words, the aspect ratio of a cross section of each heating wire 63 is preferably not larger than 1. If the thickness of the heating wires 63 is larger than the wire width, the heating wires 63 may fall over on the base material 311, for example, giving rise to a difficulty in manufacture, or there is a risk of breaking of the heating wires.

Note that the wire width and the thickness of the heating wires 63 can be measured using a microscope such as VHX-200 (manufactured by Keyence Corporation) at 1000× magnification, for example.

The pitch between adjacent heating wires 63 is preferably 1.25 to 10 mm, more preferably 1.50 to 4.0 mm, and even more preferably 2.0 to 3.0 mm. Note that the pitch is a length that is obtained by adding the wire width of a heating wire 63 to the length of a space between adjacent heating wires 63, rather than the length of the space between adjacent heating wires 63.

If the upper limit value of the pitch is set as described above, in a case in which a predetermined heat generation amount (e.g., 400 W/m$^2$) is required for the entire windshield, for example, a reduction in the heat generation amount of the entire windshield can be prevented even if the heat generation amount W of each heating wire 63 is reduced as described above, because the number of heating wires 63 can be increased by reducing the pitch. On the other hand, with respect to the lower limit of the pitch, the followings are prescribed in Japan as of November 2017. That is, with respect to a device embedded in a test region A among devices for preventing fogging of window glass, Article 39, paragraph 3, item (v) (window glass) of notification prescribing details of the Safety Standards of the Road Transportation Vehicles prescribes that "the width of the device is not larger than 0.03 mm and the density is not higher than 8 pieces/cm (if conductors are horizontally embedded, 5 pieces/cm)", and in order to satisfy the requirement of the density being not higher than 8 pieces/cm, the pitch is preferably at least 1.25 mm.

Note that in some cases, the heating wires 63 are formed into a sine wave shape. Also, there are cases in which positions or the pitch of rises and falls of the sine wave shape differ between adjacent heating wires 63. In these cases, the pitch between the heating wires 63 can be determined by counting the number n of heating wires 63 in a predetermined region. For example, in a case in which the predetermined region is a rectangular region having a side with a length of 200 mm, if 101 heating wires 63 are arranged in the region, the pitch can be determined as follows: 200/(101−1)=2 mm. The predetermined region is preferably within the range of the test region A defined in JIS R3212. This is because the test region A defined in JIS R3212 is a region for carrying out a test of perspective distortion or the like, and the necessity for preventing flickering, which is an effect of the present application, is high in this region.

The length of each heating wire 63 can be set to be at least 1000 mm, for example. The length can also be set to be at least 1100 mm, or at least 1200 mm. The resistance of the heating wires 63 is preferably at least 30Ω, and more preferably at least 90Ω. If the length of the heating wires is increased as described above, the resistance R increases according to the above-described Expression (2), and accordingly, the heat generation amount is reduced and flickering can be suppressed.

Here, measurement of the resistance R of the heating wires 63 will be described. The resistance can be measured using a commercially available electrical resistance measurement device, and one example of which is Digital Multimeter 73200 series (manufactured by Yokogawa Test & Measurement Corporation). In measurement, first, a heating wire to be measured is selected. Next, one terminal of the electrical resistance measurement device is connected to a portion of the heating wire in the vicinity of the bus bar 61, and another terminal is connected to a portion of the heating wire in the vicinity of the bus bar 62. Note that if the heating wire 63 is sandwiched between the outer glass plate 1 and the inner glass plate 2 and the terminals of the electrical resistance measurement device cannot be connected to the heating wire, the outer glass plate 1 or the inner glass plate 2 can be broken to measure the resistance R of the heating wire 63. Also, if the heating wire to be measured is connected to an adjacent heating wire via abridge (not shown), for example, the resistance R of the heating wire to be measured is measured after the bridge is cut.

When a voltage of 13.5 V is applied between the bus bars 61 and 62, for example, the heat generation amount per unit length of each heating wire 63 is preferably not larger than 2.0 W/m, more preferably not larger than 1.5 W/m, and particularly preferably not larger than 1.0 W/m. If the heat generation amount is not larger than 2.0 W/m, flickering can be suppressed. More specifically, the heat generation amount can be set to a range from 1.5 W/m to 2.0 W/m inclusive, from 1.35 W/m to 1.5 W/m inclusive, from 1.20 W/m to 1.35 W/m inclusive, from 1.0 W/m to 1.20 W/m inclusive, from 0.8 W/m to 1.0 W/m inclusive, or from 0.5 W/m to 0.8 W/m inclusive, for example. In order to effectively prevent fogging or melt frost or the like using such heating wires 63, the heat generation amount per unit area of the windshield is preferably 300 to 600 W/m$^2$, more preferably at least 400 W/m$^2$, and particularly preferably at least 500 W/m$^2$.

As described above, in general, the wire width and the pitch of the heating wires 63 in the second heat generation portion are made larger than the wire width and the pitch of the heating wires 314 of the first heat generation portion. This is because an area to be heated by the second heat generation portion is large and therefore power consumption is taken into consideration.

2. Other Aspects of Heat Generation Layer

The above-described arrangement of the first to fourth bus bars and the first and second heating wires is one example and can be appropriately changed. In the following description, the example shown in FIG. 6 will be referred to as a first aspect, and examples of other aspects will be described with reference to FIGS. 7 to 28.

(1) Second Aspect

Figure 7:
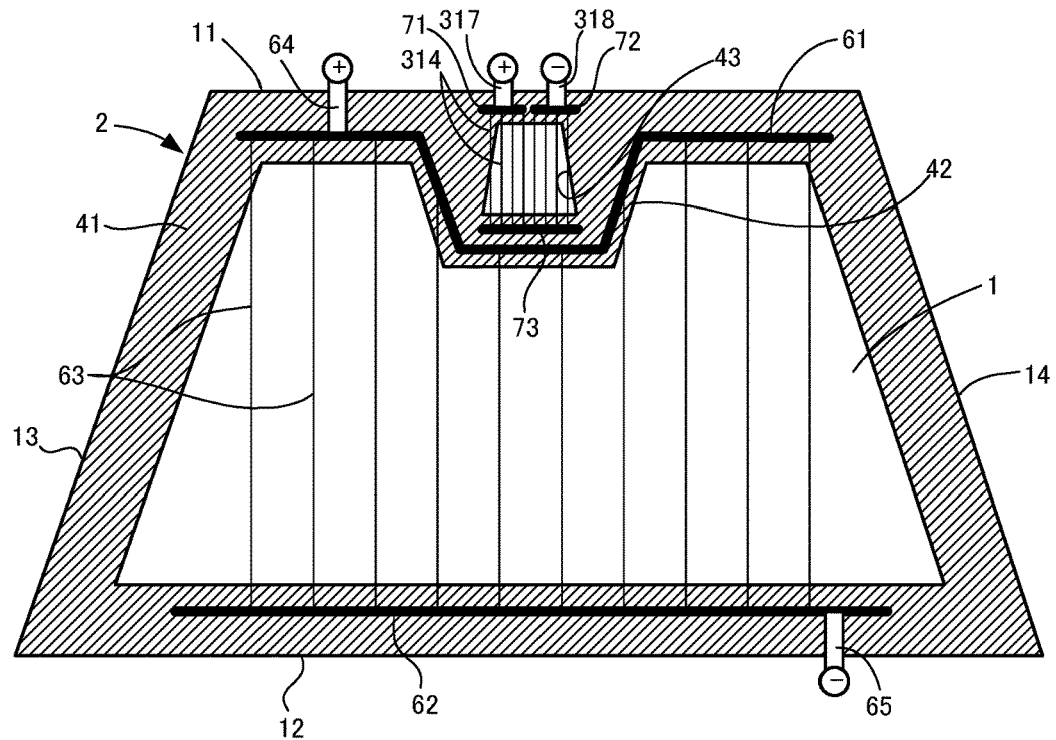
FIG. 7 is a plan view of a windshield according to a second aspect of the second embodiment.

This aspect differs from the first aspect in the configuration of the first heat generation portion, and the configuration of the second heat generation portion is the same. As shown in FIG. 7, a fifth bus bar 71 and a sixth bus bar 72 are arranged on a straight line on the upper side of the window portion 43, and a relay bus bar 73 is arranged on the lower side of the window portion 43. The first connection member 317 connected to a positive electrode is attached to the fifth bus bar 71, and the second connection member 318 connected to a negative electrode is connected to the sixth bus bar 72. The fifth bus bar 71 and the sixth bus bar 72 are adjacent to each other with a space therebetween, and the relay bus bar 73 is made longer than the fifth bus bar 71 and the sixth bus bar 72. The plurality of first heating wires 314 connect the fifth bus bar 71 to a right side region of the relay bus bar 73 and connect the sixth bus bar 72 to a left side region of the relay bus bar 73. Accordingly, when a voltage is applied between the first connection member 317 and the second connection member 318, a current flows through the fifth bus bar 71, the relay bus bar 73, and the sixth bus bar 72 in that order, and the first heating wires 314 generate heat. As described above, in the second aspect, the first heat generation portion and the second heat generation portion are constituted by different circuits and heat generation can be separately controlled.

(2) Third Aspect

Figure 8:
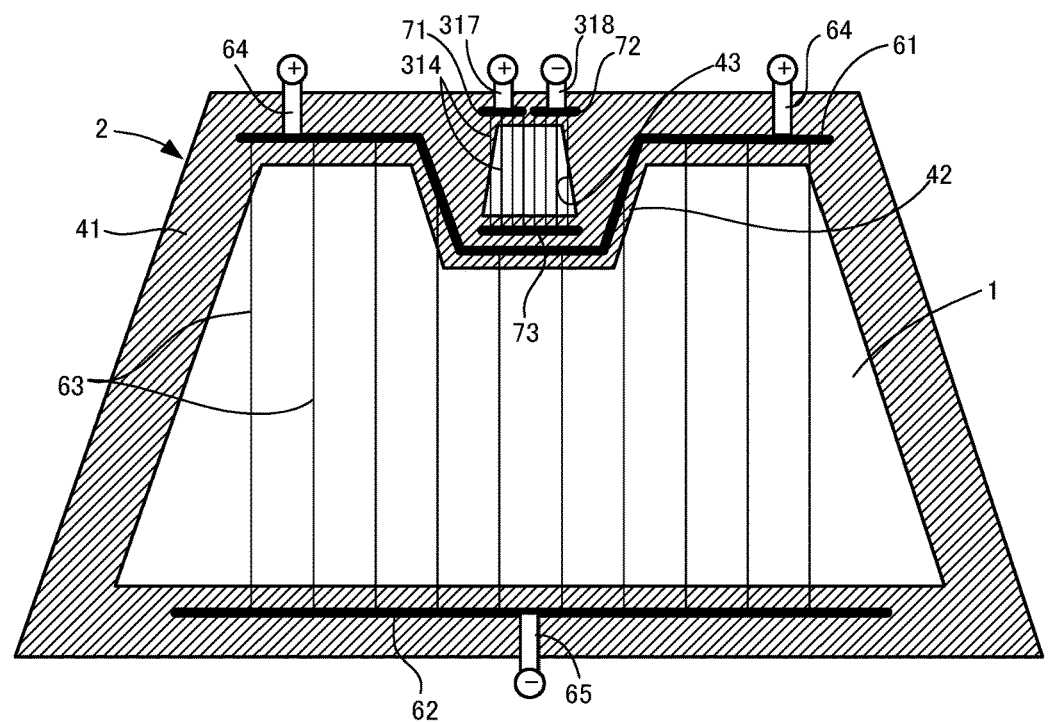
FIG. 8 is a plan view of a windshield according to a third aspect of the second embodiment.

As shown in FIG. 8, a third aspect differs from the second aspect in the configuration of the second heat generation portion. That is, third connection members 64 are respectively attached to both end portions of the third bus bar 61. Further, the second connection member 65 is attached to a center portion of the fourth bus bar 62. As described above, in the third aspect, the first heat generation portion and the second heat generation portion are constituted by different circuits and heat generation can be separately controlled.

(3) Fourth Aspect

Figure 9:
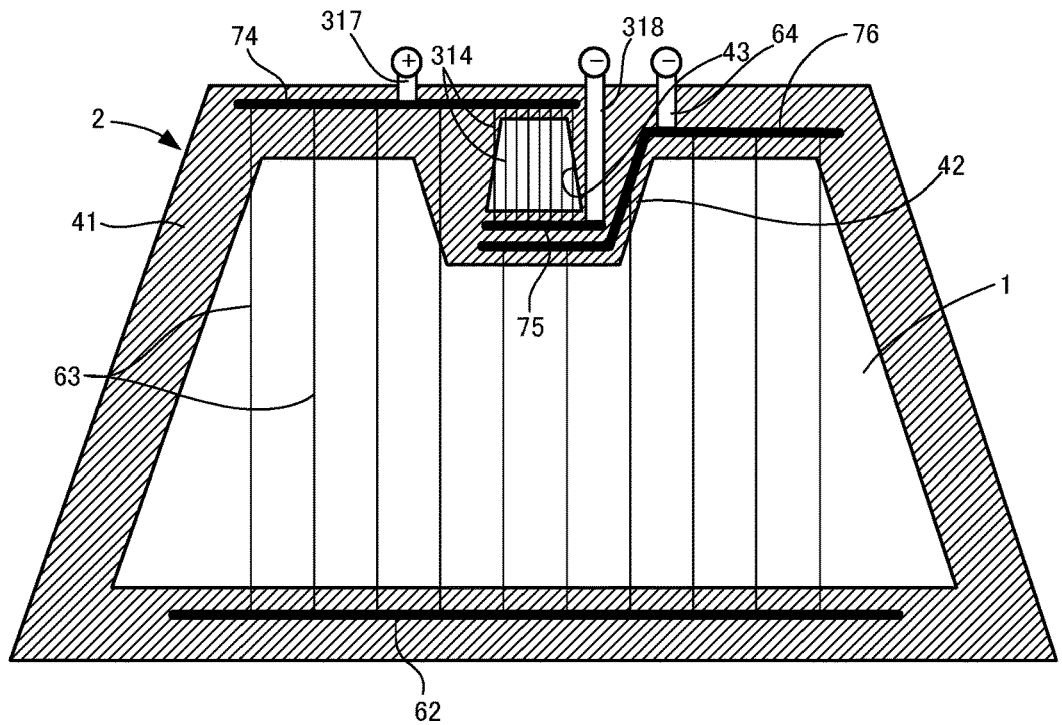
FIG. 9 is a plan view of a windshield according to a fourth aspect of the second embodiment.

As shown in FIG. 9, in this aspect, a seventh bus bar 74 is formed at the upper side 11 of the windshield so as to extend from a left end portion to the upper side of the window portion 43. Also, an eighth bus bar 75 that extends along the lower side of the window portion 43 is formed. Further, a ninth bus bar 76 is formed so as to extend rightward along the lower side of the window portion 43 while passing below the eighth bus bar 75 and further extend along the upper side 11 of the windshield while passing the peripheral portion 41 of the mask layer 4. Also, the fourth bus bar 62 is formed so as to extend along the lower side 12 of the windshield similarly to the third aspect.

On the other hand, the plurality of first heating wires 314 extend between the seventh bus bar 74 and the eighth bus bar 75 while passing through the window portion 43 in the up-down direction. Some of the plurality of second heating wires 63 are arranged so as to extend in the up-down direction between a region of the seventh bus bar 74 on the left side of the first heating wires 314 and a left side region of the fourth bus bar 62. Further, on the right side of these second heating wires, a plurality of second heating wires 63 are arranged parallel to each other so as to extend in the up-down direction between the ninth bus bar 76 and the fourth bus bar 62.

The first connection member 317 extending upward is attached to the seventh bus bar 74 and connected to a positive electrode. Also, the second connection member 318 extending upward is attached to the eighth bus bar 75 and connected to a negative electrode. Further, the third connection member 64 extending upward is attached to the ninth bus bar 76 and connected to a negative electrode. As described above, in the fourth aspect, the positive electrode is common to the first heat generation portion and the second heat generation portion, and the negative electrodes are separately provided.

(4) Fifth Aspect

Figure 10:
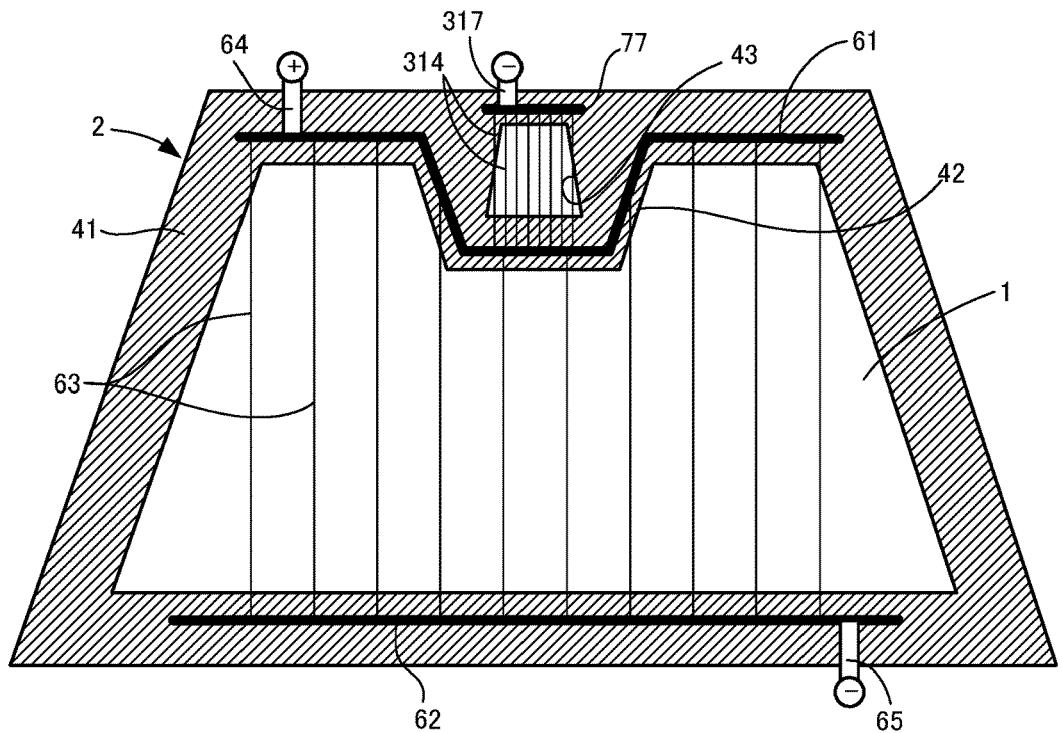
FIG. 10 is a plan view of a windshield according to a fifth aspect of the second embodiment.

As shown in FIG. 10, in a fifth aspect, a tenth bus bar 77 is formed along the upper side of the window portion 43. The plurality of first heating wires 314 are arranged so as to extend in the up-down direction between the tenth bus bar 77 and the third bus bar 61. The first connection member 317 extending upward is attached to the tenth bus bar 77 and connected to a negative electrode. The configuration of the second heat generation portion is the same as that in the first aspect. As described above, in the fifth aspect, the positive electrode is common to the first heat generation portion and the second heat generation portion, and the negative electrodes are separately provided.

(5) Sixth Aspect

Figure 11:
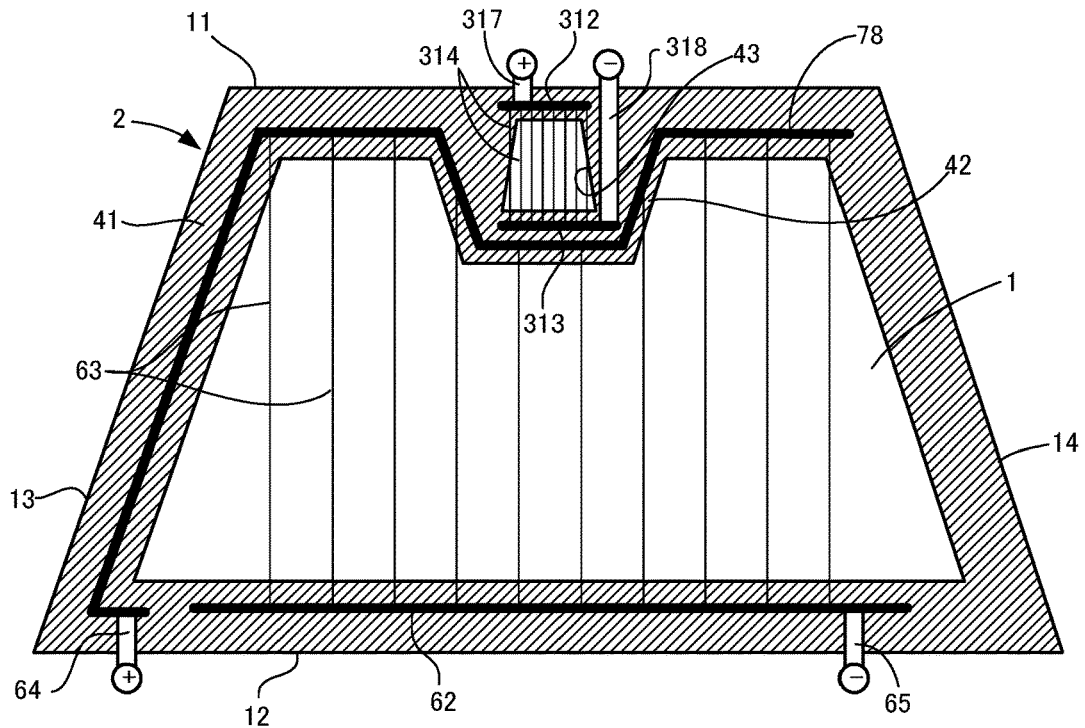
FIG. 11 is a plan view of a windshield according to a sixth aspect of the second embodiment.

As shown in FIG. 11, a sixth aspect differs from the first aspect in the configuration of the third bus bar 61. That is, an extension portion that extends to the vicinity of a left end portion of the lower side 12 of the windshield via the left side 13 of the windshield is joined to a left end portion of the third bus bar 61. The thus formed bus bar will be referred to as an eleventh bus bar 78. The fourth bus bar is made slightly shorter so as not to be in contact with the eleventh bus bar 78. Also, the third connection member 64 that extends downward at the lower side 12 of the windshield is attached to the eleventh bus bar 78 and connected to a positive electrode. Accordingly, both connection members of the second heat generation portion are connected to power supply terminals at the lower side of the windshield. As described above, in the sixth aspect, the first heat generation portion and the second heat generation portion are constituted by different circuits and heat generation can be separately controlled.

(6) Seventh Aspect

Figure 12:
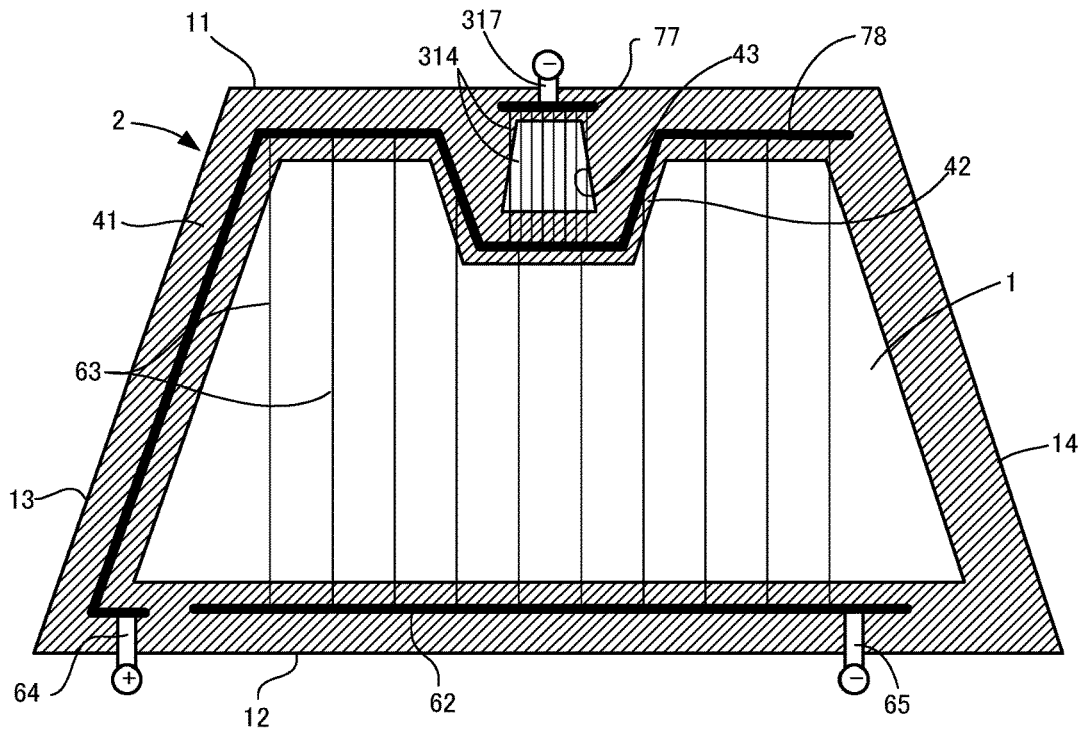
FIG. 12 is a plan view of a windshield according to a seventh aspect of the second embodiment.

As shown in FIG. 12, in a seventh aspect, the third bus bar 61 in the fifth aspect is replaced with the eleventh bus bar 78. As described above, in the seventh aspect, the positive electrode is common to the first heat generation portion and the second heat generation portion, and the negative electrodes are separately provided.

(7) Eighth Aspect

Figure 13:
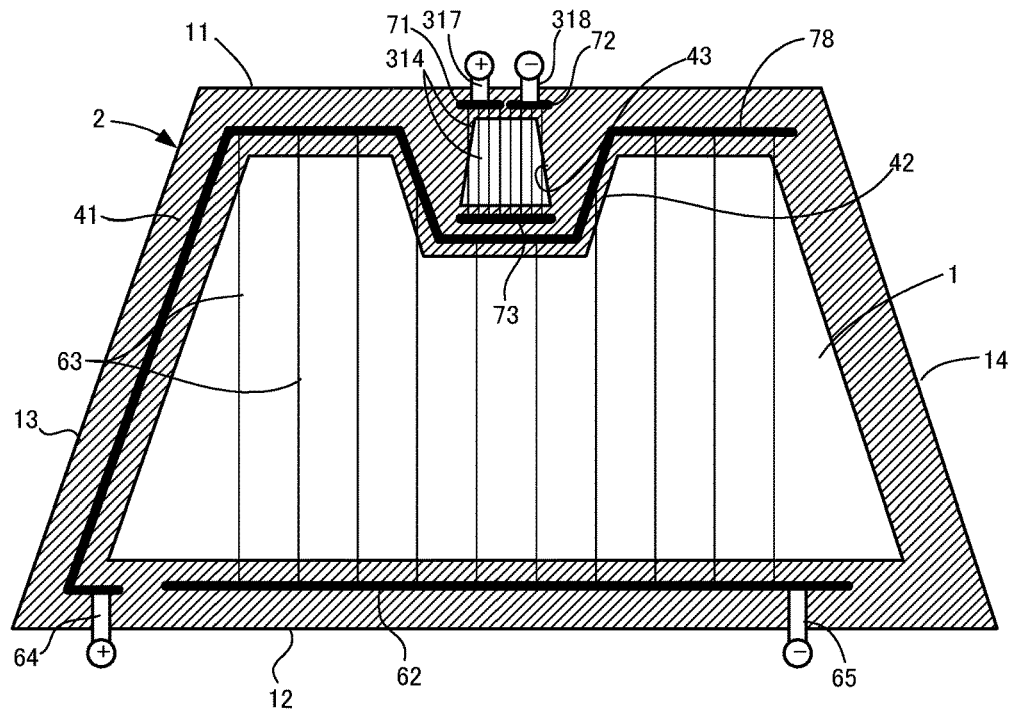
FIG. 13 is a plan view of a windshield according to an eighth aspect of the second embodiment.

As shown in FIG. 13, in an eighth aspect, the third bus bar 61 in the second aspect is replaced with the eleventh bus bar 78. As described above, in the eighth aspect, the first heat generation portion and the second heat generation portion are constituted by different circuits and heat generation can be separately controlled.

(8) Ninth Aspect

Figure 14:
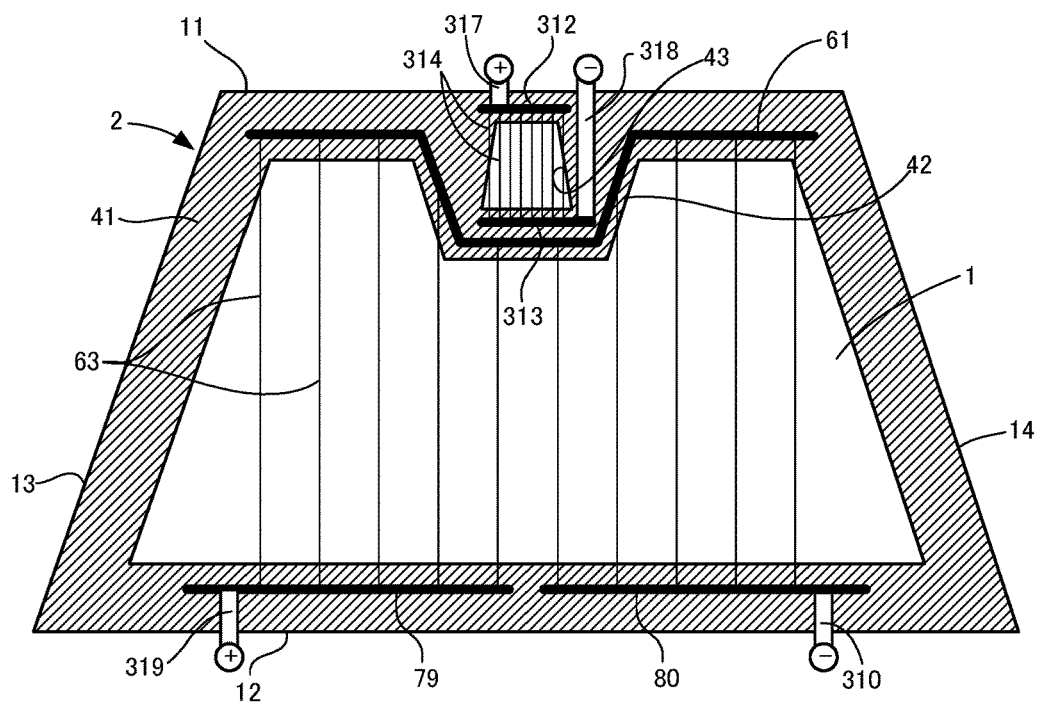
FIG. 14 is a plan view of a windshield according to a ninth aspect of the second embodiment.

As shown in FIG. 14, a ninth aspect includes a twelfth bus bar 79 and a 13th bus bar 80 that are formed by dividing the fourth bus bar 62 in the first aspect into two sections in the left-right direction. A third connection member 319 is attached to the twelfth bus bar 79 and connected to a positive electrode. On the other hand, a fourth connection member 310 is connected to the 13th bus bar 80 and a negative electrode. With this configuration, in the second heat generation portion, a current flows from the twelfth bus bar 79 via the third bus bar 61 to the 13th bus bar 80. As described above, in the eighth aspect, the first heat generation portion and the second heat generation portion are constituted by different circuits and heat generation can be separately controlled.

(9) Tenth Aspect

Figure 15:
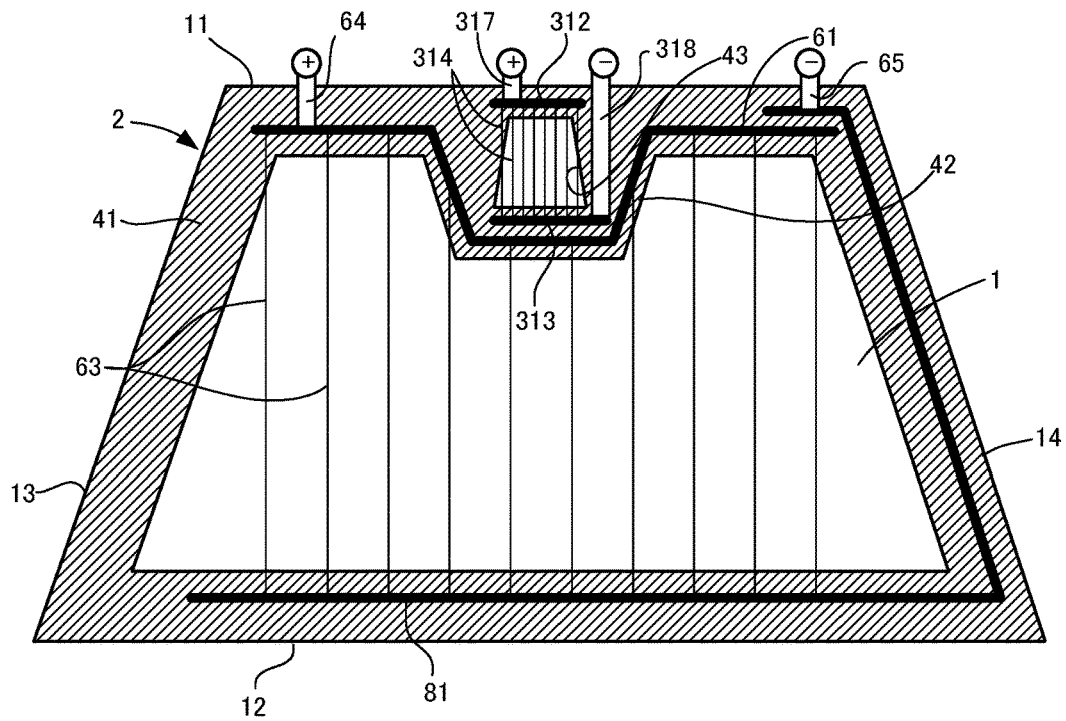
FIG. 15 is a plan view of a windshield according to a tenth aspect of the second embodiment.

As shown in FIG. 15, a tenth aspect differs from the first aspect in the configuration of the fourth bus bar 62. That is, an extension portion that extends to the vicinity of a right end portion of the upper side 11 of the windshield via the right side 14 of the windshield is joined to a right end portion of the fourth bus bar 62. A portion of this extension portion that is located at the upper side 11 is arranged on the upper side of the third bus bar 61. The thus formed bus bar will be referred to as a 14th bus bar 81. The fourth connection member 65 that extends upward at the upper side 11 of the windshield is attached to the 14th bus bar 81 and connected to a negative electrode. Accordingly, both connection members 64 and 65 of the second heat generation portion are connected to power supply terminals at the upper side 11 of the windshield. As described above, in the tenth aspect, the first heat generation portion and the second heat generation portion are constituted by different circuits and heat generation can be separately controlled.

(10) Eleventh Aspect

Figure 16:
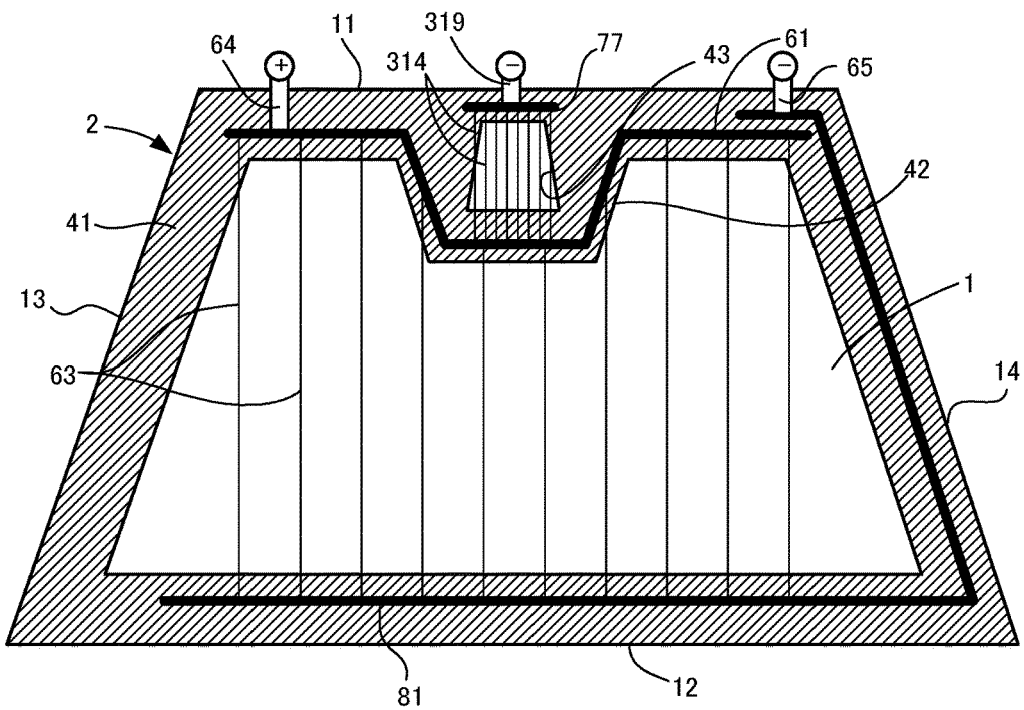
FIG. 16 is a plan view of a windshield according to an eleventh aspect of the second embodiment.

As shown in FIG. 16, in an eleventh aspect, the fourth bus bar 62 in the fifth aspect is replaced with the 14th bus bar 81. Accordingly, both connection members 64 and 65 of the second heat generation portion are connected to power supply terminals at the upper side 11 of the windshield. As described above, in the eleventh aspect, the positive electrode is common to the first heat generation portion and the second heat generation portion, and the negative electrodes are separately provided.

(11) Twelfth Aspect

Figure 17:
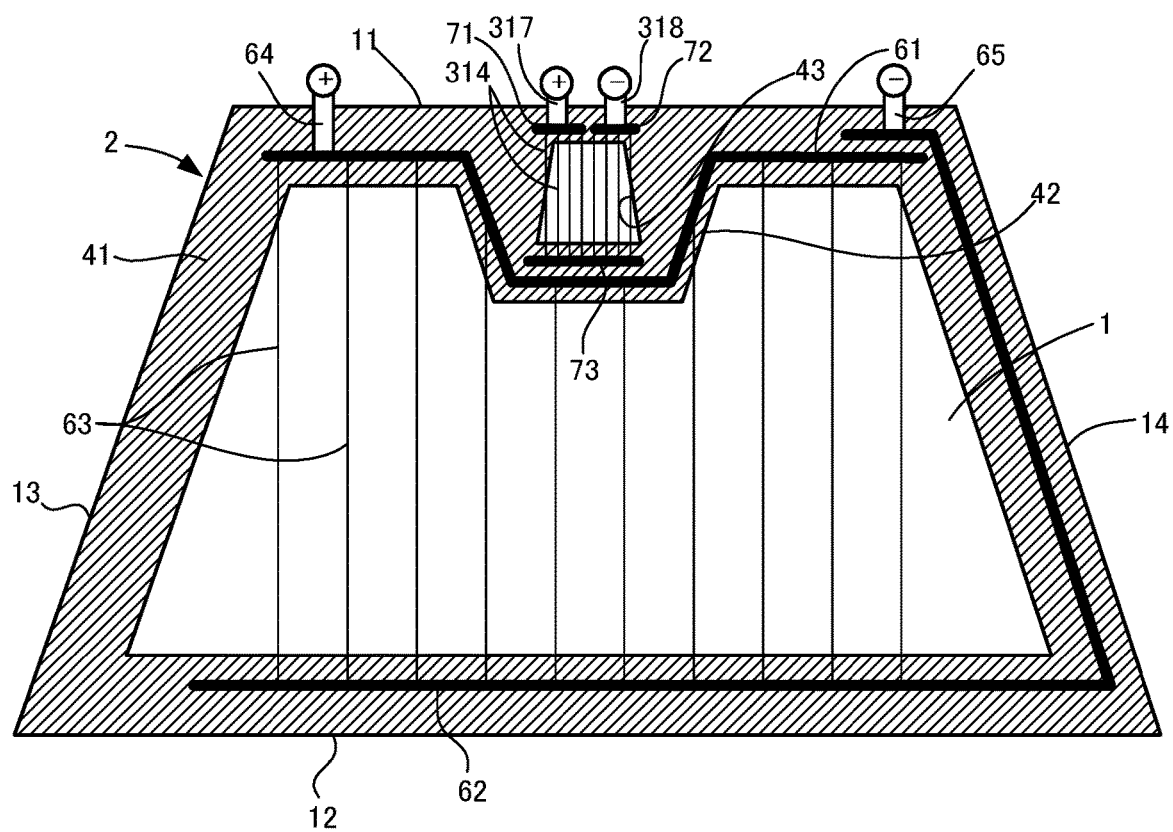
FIG. 17 is a plan view of a windshield according to a twelfth aspect of the second embodiment.

As shown in FIG. 17, in a twelfth aspect, the fourth bus bar 62 in the second aspect is replaced with the 14th bus bar 81. Accordingly, both connection members 64 and 65 of the second heat generation portion are connected to power supply terminals at the upper side 11 of the windshield. As described above, in the twelfth aspect, the first heat generation portion and the second heat generation portion are constituted by different circuits and heat generation can be separately controlled.

(12) 13th Aspect

Figure 18:
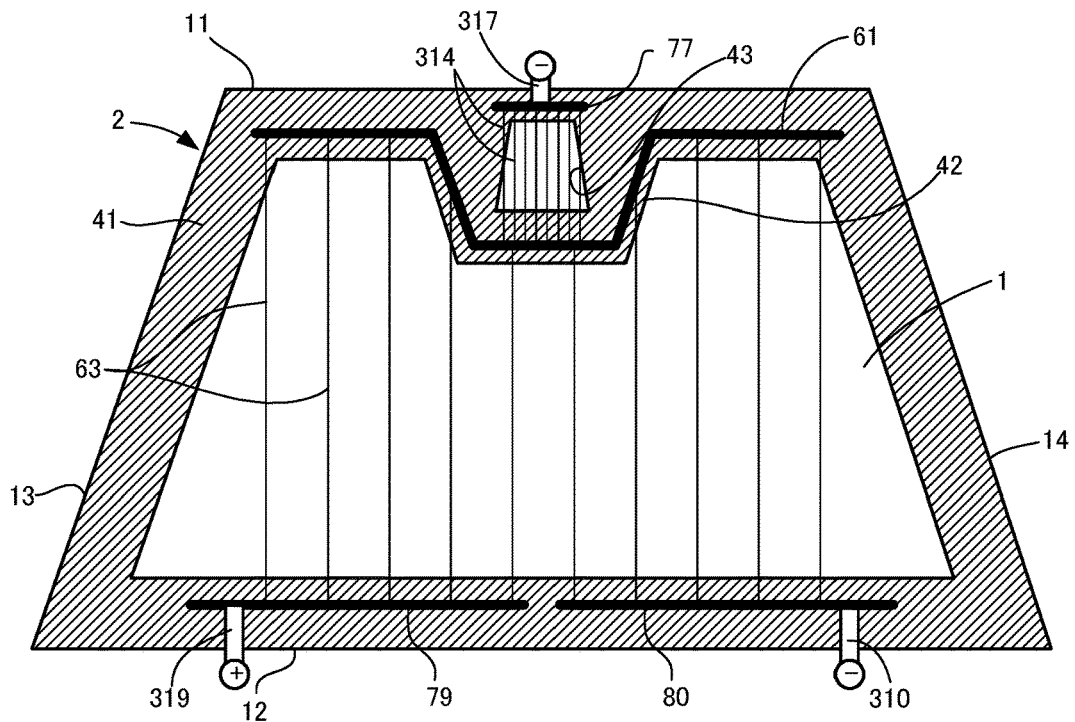
FIG. 18 is a plan view of a windshield according to a 13th aspect of the second embodiment.

As shown in FIG. 18, in an eleventh aspect, the fourth bus bar 62 in the fifth aspect is replaced with the twelfth bus bar 79 and the 13th bus bar 80 described in the ninth aspect. Accordingly, both connection members 319 and 310 of the second heat generation portion are connected to power supply terminals at the lower side 12 of the windshield. As described above, in the 13th aspect, the first heat generation portion and the second heat generation portion are constituted by different circuits and heat generation can be controlled.

(13) 14th Aspect

Figure 19:
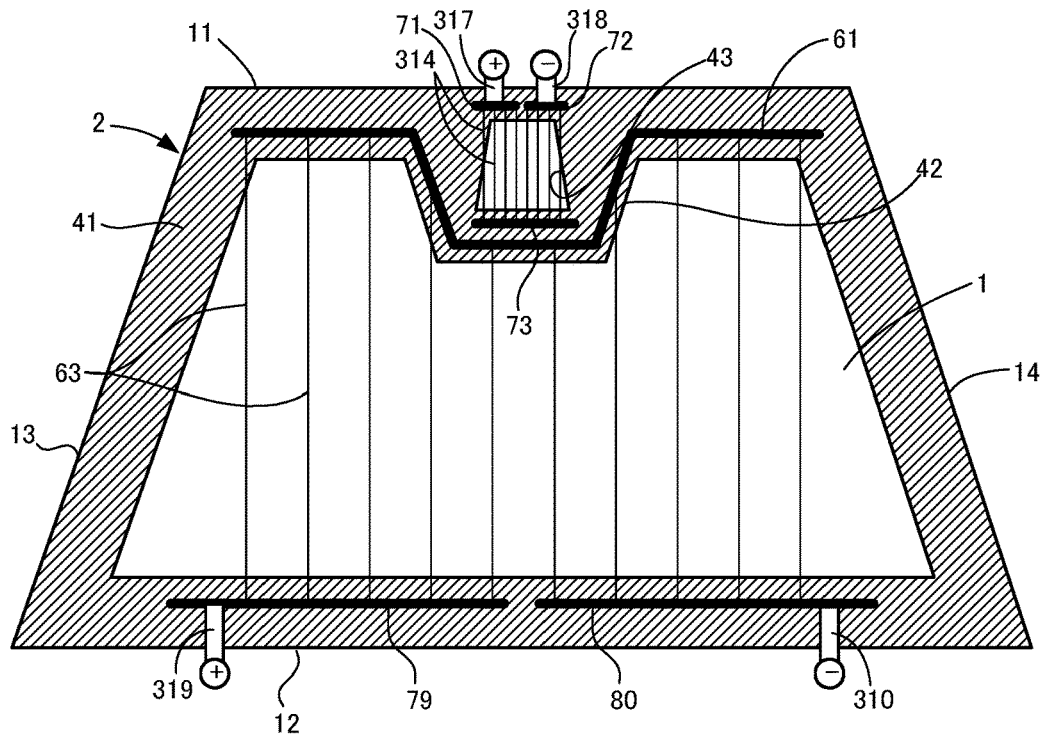
FIG. 19 is a plan view of a windshield according to a 14th aspect of the second embodiment.

As shown in FIG. 19, in a 14th aspect, the fourth bus bar 62 in the second aspect is replaced with the twelfth bus bar 79 and the 13th bus bar 80 described in the ninth aspect. As described above, in the 14th aspect, the first heat generation portion and the second heat generation portion are constituted by different circuits and heat generation can be separately controlled.

(14) 15th Aspect

Figure 20:
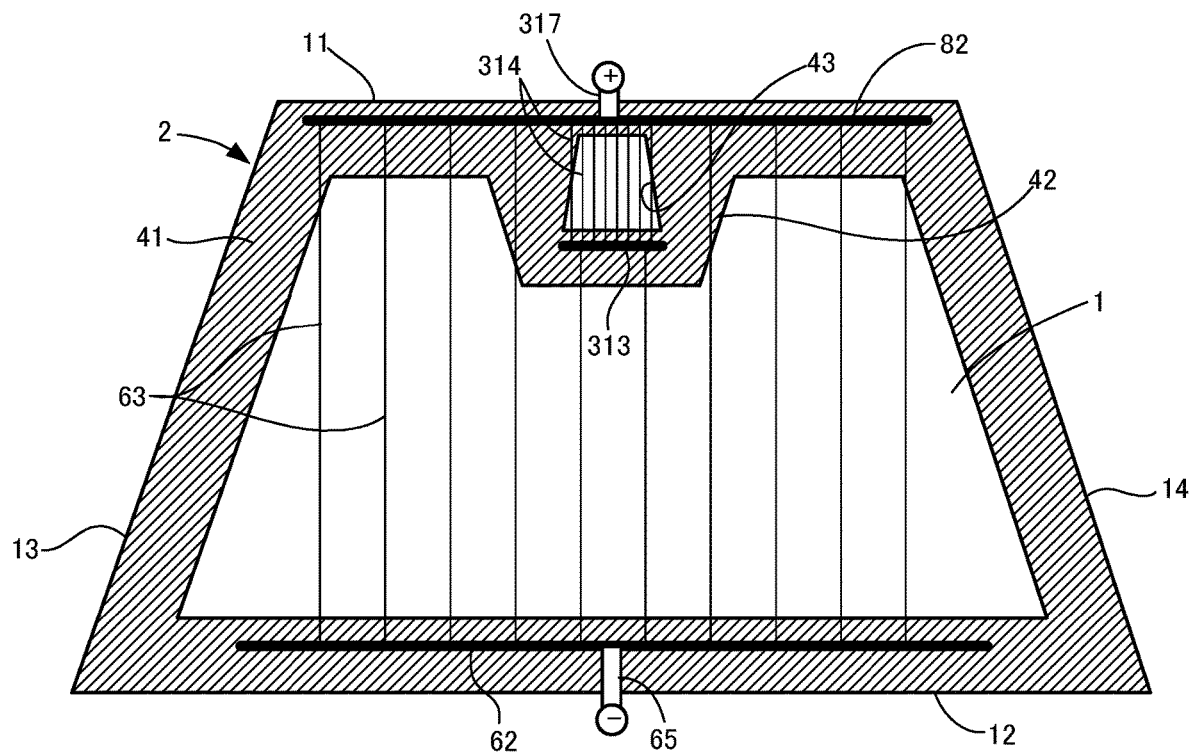
FIG. 20 is a plan view of a windshield according to a 15th aspect of the second embodiment.

As shown in FIG. 20, in a 15th aspect, a 15th bus bar 82 that extends along almost the entire length of the upper side 11 of the windshield is provided. The 15th bus bar 82 is arranged on the upper side of the window portion 43. The plurality of first heating wires 314 are arranged between the 15th bus bar 82 and the second bus bar 313 so as to pass through the window portion 43. Also, a plurality of second heating wires 63 are arranged between the 15th bus bar 82 and the fourth bus bar 62 in regions where the first heating wires 314 are not arranged, i.e., on both sides of the window portion 43. Also, a plurality of second heating wires 63 are arranged between the second bus bar 313 and the fourth bus bar 62. The first connection member 317 is attached to the 15th bus bar 82 and extends upward. The first connection member 317 is connected to a positive electrode. As described above, in the 13th aspect, the first heat generation portion and the second heat generation portion are constituted by a common circuit.

(15) 16th Aspect

Figure 21:
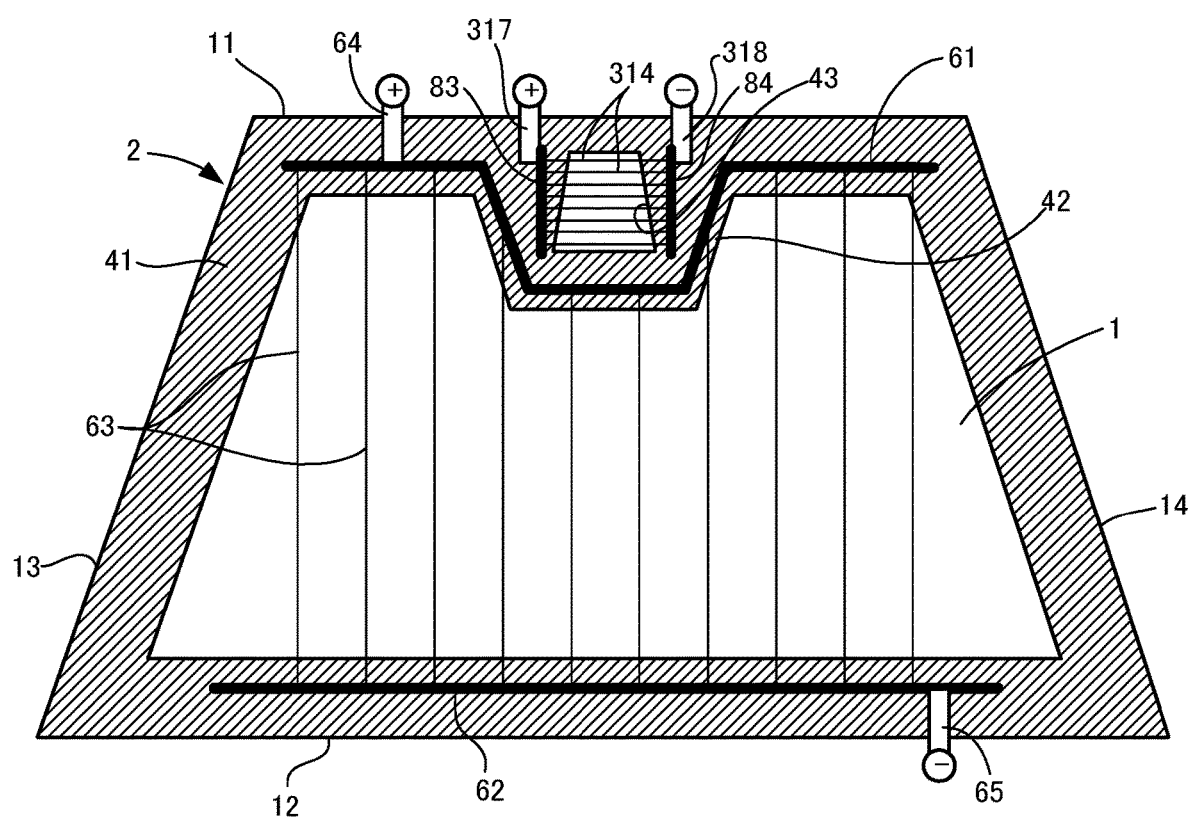
FIG. 21 is a plan view of a windshield according to a 16th aspect of the second embodiment.

As shown in FIG. 21, a 16th aspect differs from the first aspect in the configuration of the first heat generation portion. That is, a 16th bus bar 83 is arranged on the left side of the window portion 43, and a 17th bus bar 84 is arranged on the right side of the window portion 43. Both of the 16th bus bar 83 and the 17th bus bar 84 extend in the up-down direction. A plurality of first heating wires 314 that extend in the horizontal direction between the 16th bus bar 83 and the 17th bus bar 84 are arranged parallel to each other. The configuration of the second heat generation portion is the same as that in the first aspect. As described above, in the 16th aspect, the first heat generation portion and the second heat generation portion are constituted by different circuits and heat generation can be separately controlled.

(16) 17th Aspect

Figure 22:
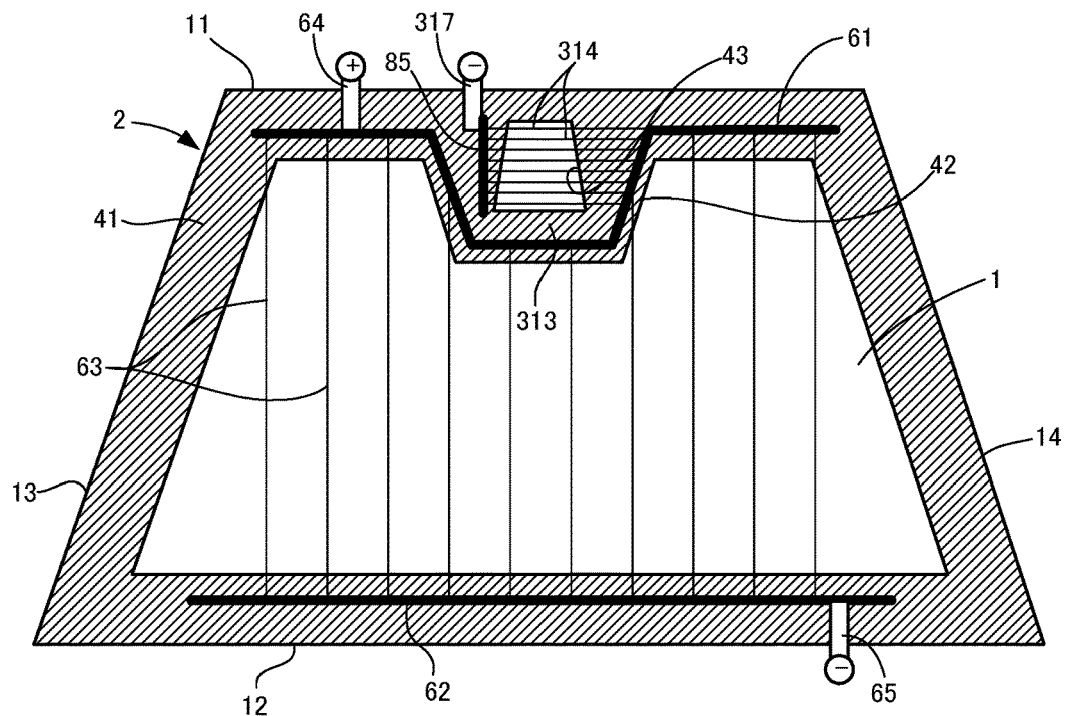
FIG. 22 is a plan view of a windshield according to a 17th aspect of the second embodiment.

As shown in FIG. 22, a 17th aspect differs from the first aspect in the configuration of the first heat generation portion. That is, an 18th bus bar 85 that extends in the up-down direction is arranged on the left side of the window portion 43. A plurality of first heating wires 314 extend parallel to each other in the horizontal direction from the 18th bus bar 85, pass the window portion 43, and are connected to the third bus bar 61. The first connection member 317 is attached to the 18th bus bar 85 and extends upward. The first connection member 317 is connected to a negative electrode. As described above, in the 17th aspect, the positive electrode is common to the first heat generation portion and the second heat generation portion and the negative electrodes are separately provided.

(17) 18th Aspect

Figure 23:
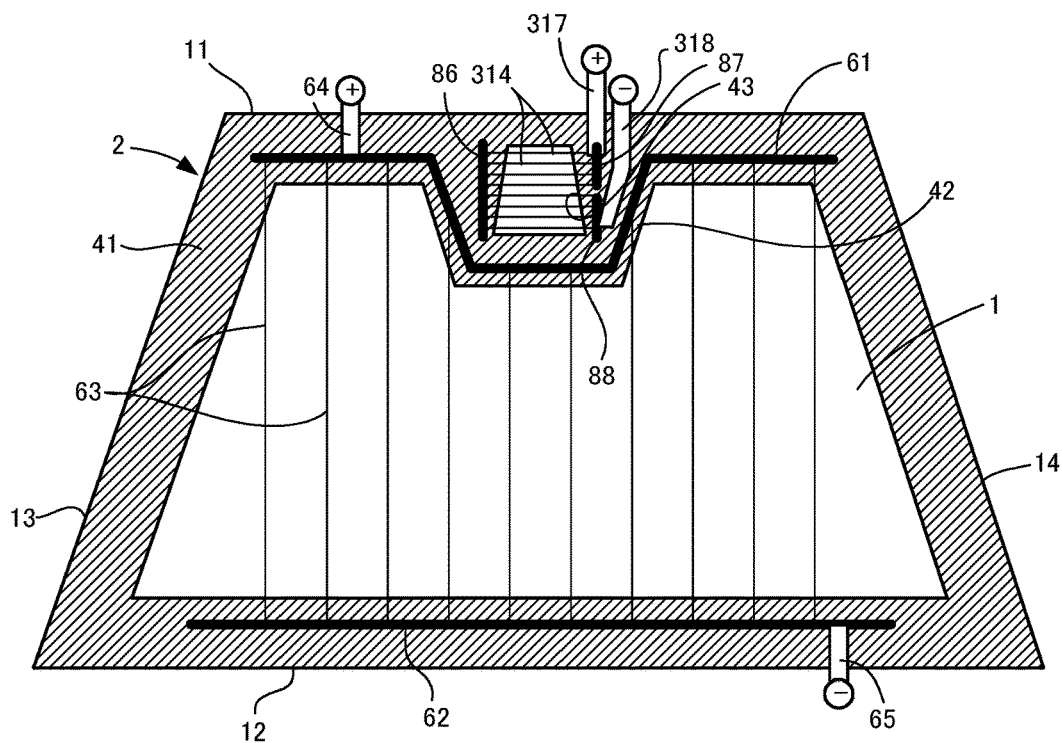
FIG. 23 is a plan view of a windshield according to an 18th aspect of the second embodiment.

As shown in FIG. 23, an 18th aspect differs from the first aspect in the configuration of the first heat generation portion. That is, a 19th bus bar 86 that extends in the up-down direction is arranged on the left side of the window portion 43, and a 20th bus bar 87 and a 21st bus bar 88 that extend in the up-down direction are arranged on the right side of the window portion 43. The 20th bus bar 87 is arranged on the upper side of the 21st bus bar 88 with a space therebetween. An upper portion of the 19th bus bar 86 and the 20th bus bar 87 are connected to a plurality of first heating wires 314 extending in the horizontal direction, and a lower portion of the 19th bus bar 86 and the 21st bus bar 88 are connected to a plurality of first heating wires 314 extending in the horizontal direction. The first connection member 317 extending upward is attached to the 20th bus bar 87 and connected to a positive electrode. On the other hand, the second connection member 318 extending upward is attached to the 21st bus bar 88 and connected to a negative electrode. Accordingly, a current flows from the 20th bus bar 87 via the 19th bus bar 86 to the 21st bus bar 88. As described above, in the 18th aspect, the first heat generation portion and the second heat generation portion are constituted by different circuits and heat generation can be separately controlled.

(18) 19th Aspect

Figure 24:
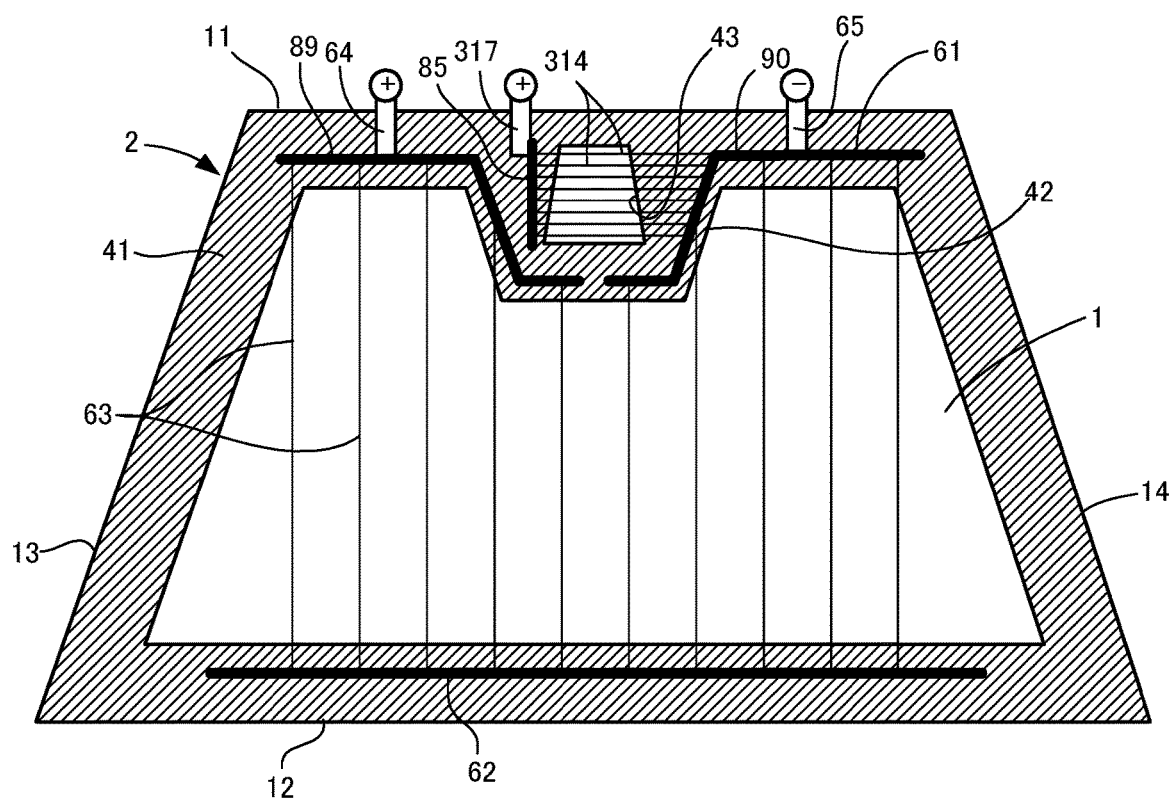
FIG. 24 is a plan view of a windshield according to a 19th aspect of the second embodiment.

As shown in FIG. 24, a 19th aspect differs from the 17th aspect in the configuration of the second heat generation portion. That is, the third bus bar 61 in the 17th aspect is divided into a 22nd bus bar 89 and a 23rd bus bar 90 in the left-right direction. The 18th bus bar 85 is connected to the 23rd bus bar 90 via a plurality of first heating wires 314 extending in the horizontal direction. The third connection member 64 is attached to the 22nd bus bar 89 and connected to a positive electrode. On the other hand, the fourth connection member 65 is attached to the 23rd bus bar 90 and connected to a negative electrode. A plurality of second heating wires 63 connect the 22nd bus bar 89 to a left side region of the fourth bus bar 62 and connect the 23rd bus bar 90 to a right side region of the fourth bus bar 62. Accordingly, in the second heat generation portion, a current flows from the 22nd bus bar 89 via the fourth bus bar 62 to the 23rd bus bar 90.

(19) 20th Aspect

Figure 25:
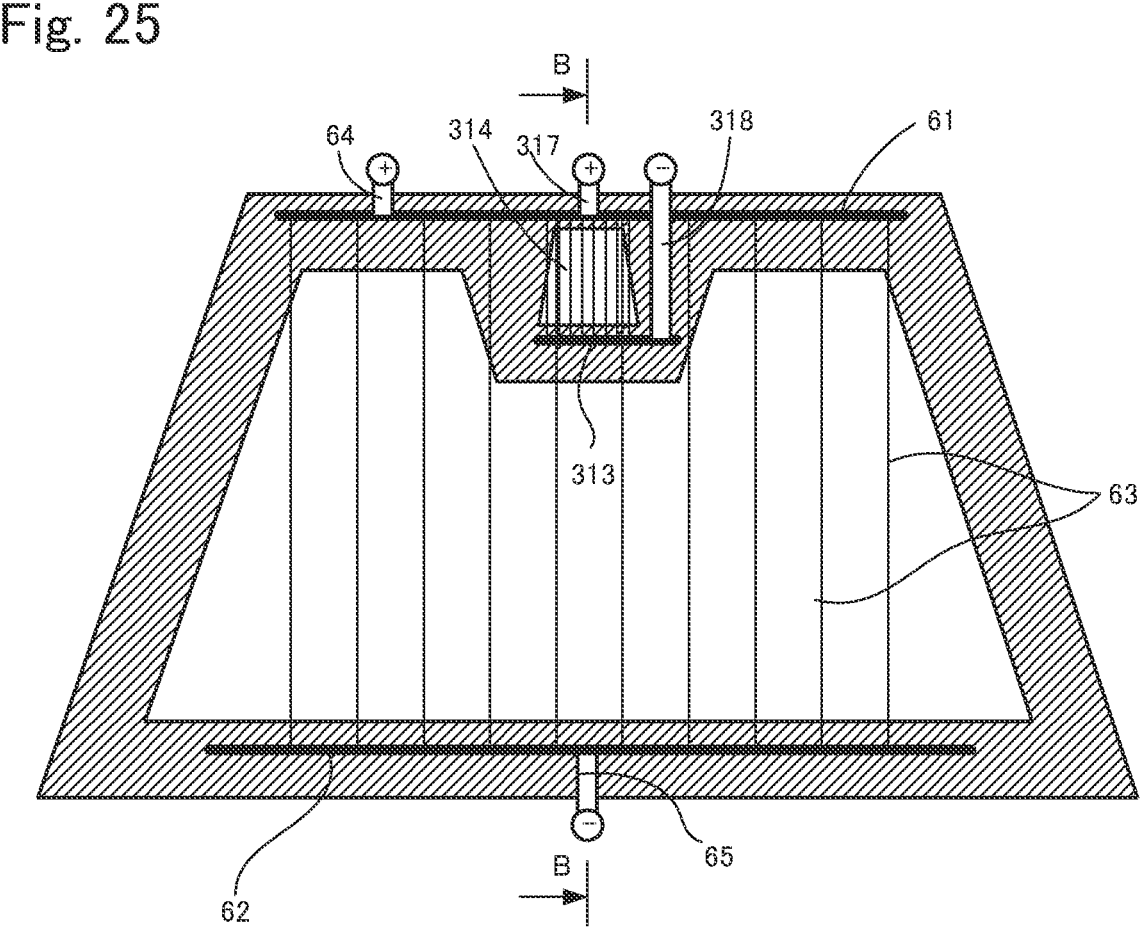
FIG. 25 is a plan view of a windshield according to a 20th aspect of the second embodiment.
Figure 26:
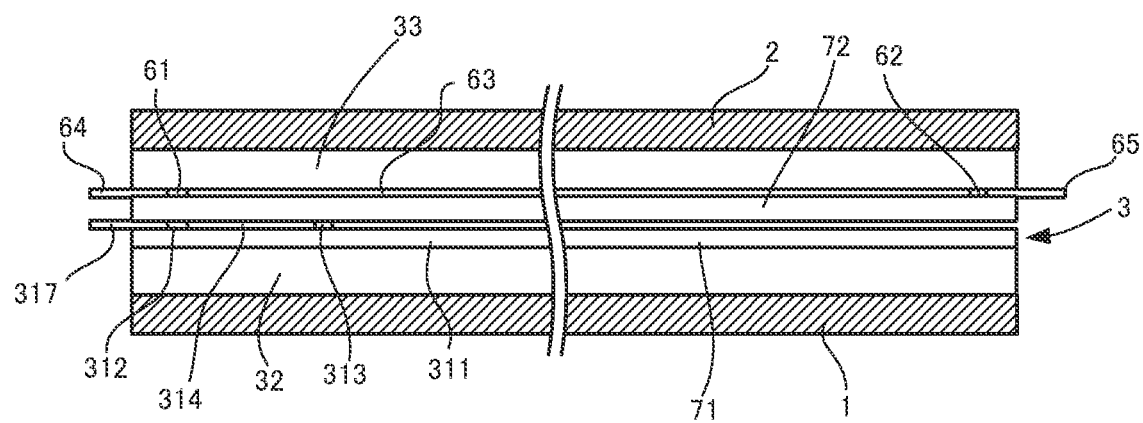
FIG. 26 is a cross-sectional view taken along line B-B in FIG. 25.
Figure 27:
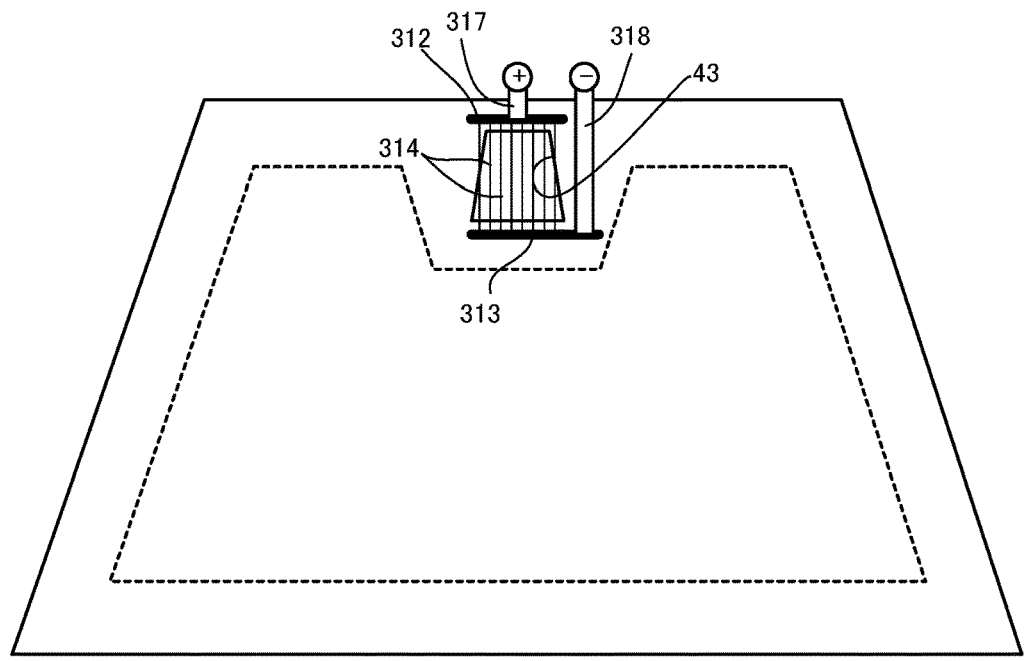
FIG. 27 is a plan view of a first heat generation portion of the windshield shown in FIG. 25.

In the above-described first to 19th aspects, the first heat generation portion and the second heat generation portion are provided in a single heat generation layer, but in a 20th aspect, the first heat generation portion and the second heat generation portion are provided in separate heat generation layers. FIG. 25 is a plan view of the 20th aspect and FIG. 26 is a cross-sectional view taken along line B-B in FIG. 25. FIG. 27 is a plan view showing a first heat generation layer in which the first heat generation portion is provided, and FIG. 28 is a plan view showing a second heat generation layer in which the second heat generation portion is provided.

As shown in FIG. 26, the intermediate film 3 includes a first base material 71 that constitutes the first heat generation portion and a second base material 72 that constitutes the second heat generation portion. The first and second base materials are constituted by the same material as the above-described base material 31 and are slightly smaller than the glass plates 1 and 2. However, the first and second base materials may also have the same size as the glass plates 1 and 2. As shown in FIG. 27, the first bus bar 312, the second bus bar 313, the first heating wires 314, the first connection member 317, and the second connection member 318 are arranged on the first base material 71. Configurations of these members are the same as those in the first embodiment. On the other hand, as shown in FIG. 28, the third bus bar 61, the second bus bar 62, the second heating wires 63, the third connection member 64, and the fourth connection portion 65 are arranged on the second base material 72. Out of these members, the third bus bar 61 is formed into a straight line shape and extends along the upper side 11 of the glass plates 1 and 2 on the upper side of the window portion 43, but configurations of the other members are the same as those in the first aspect.

Figure 28:
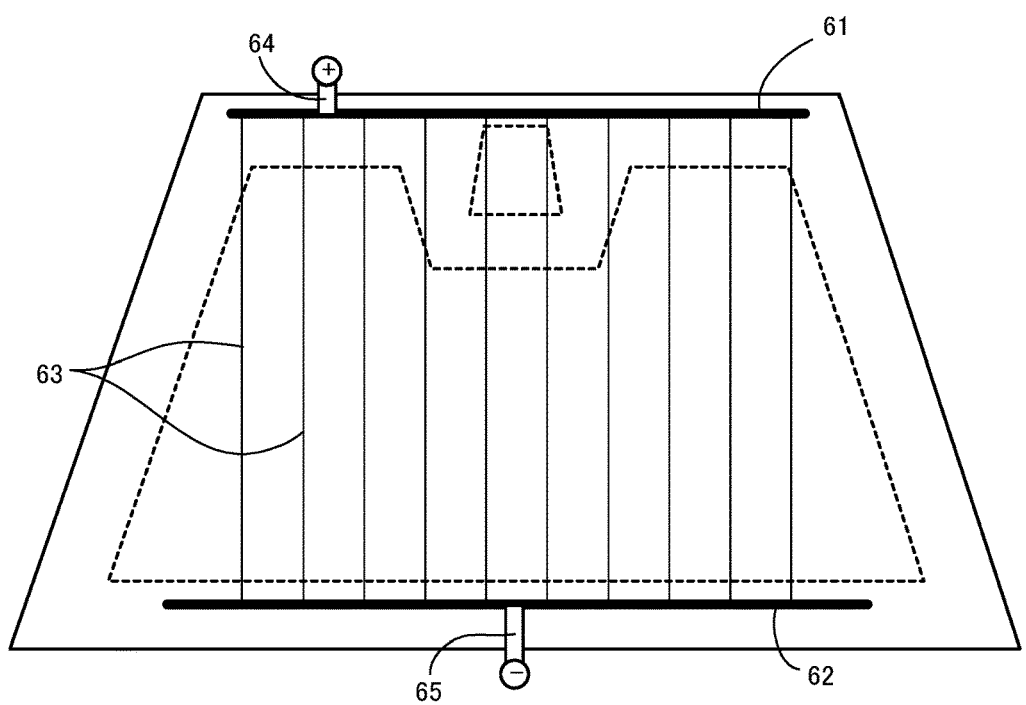
FIG. 28 is a plan view of a second heat generation portion of the windshield shown in FIG. 25.

As shown in FIG. 26, the first heat generation portion and the second heat generation portion shown in FIGS. 27 and 28 are overlaid on each other and sandwiched between the adhesive layers 32 and 33. When viewed from the front, the first bus bar 312 overlaps the third bus bar 61. As described above, in the 20th aspect, the first heat generation portion and the second heat generation portion are constituted by different circuits and heat generation can be separately controlled.

3. Characteristics

As described above, according to the present embodiment, the view field region of the windshield can be heated in addition to the window portion 43. Therefore, it is possible to melt frost and remove fog over the entire windshield. In particular, specifications of the heating wires 63 are determined as described above, and therefore a sufficient amount of heat can be generated in the view field region to melt frost or the like.

C. Variations

Although one embodiment of the present invention has been described, the present invention is not limited to the above embodiment, and various alterations can be made without departing from the gist of the present invention. Also, the following variations can be appropriately combined.

1. In the above-described embodiments, each bus bar is hidden by the mask layer 4, but the present invention is not limited to this configuration, and a configuration is also possible in which bus bars are not hidden by the mask layer 4. Also, the shield layer 7 does not necessarily have to be provided. There is no particular limitation on the shape of the mask layer 4. Also, there is no particular limitation on the shape of the window portion 43 that forms an information acquisition region in the present invention.

2. In the above-described embodiment, the interlayer 3 is constituted by a total of three layers, i.e., the heat generation layer 31 and the pair of adhesive layers 32 and 33, but the present invention is not limited to this configuration. That is, the interlayer 3 is only required to include at least the bus bars 312 and 313 and the heating wires 6. For example, the heating wires can also be arranged on a surface of the base material 311 on the outer glass plate 1 side. Alternatively, a configuration is also possible in which the base material 311 is not provided in the heat generation layer 31, and the heating wires 6 are arranged between the adhesive layers 32 and 33.

3. The heat generation layer 31 can be formed into various shapes. For example, it is possible to prepare a sheet-shaped heat generation layer 31 in which the bus bars and the heating wires are formed on the base material 311 in advance, appropriately cut the heat generation layer 31, and then arrange the heat generation layer 31 between the glass plates 1 and 2. Accordingly, if edges of the glass plates 1 and 2 are curved, for example, an edge of the base material 311 may also be curved so as to conform to the edges of the glass plates. The shape of the heat generation layer 31 need not completely match the shapes of the glass plates 1 and 2, and the heat generation layer 31 may be arranged only in a portion in which an anti-fogging effect is desired, and accordingly, the heat generation layer 31 can be formed into various shapes, e.g., can be made smaller than the glass plates 1 and 2. Note that the glass plates 1 and 2 can also be formed into various shapes other than an exact rectangle.

In the above-described embodiments, the bus bars and the heating wires are arranged on the base material 311, but it is only necessary to arrange at least the heating wires on the base material 311. Accordingly, a configuration is also possible in which the bus bars are arranged between the adhesive layers 32 and 33.

4. In the second embodiment, adjacent second heating wires 63 may also be connected to each other via at least one bridge. In this case, even if a second heating wire 63 is broken, for example, electricity can be passed through an adjacent second heating wire 63. There is no particular limitation on the number and positions of bridge wires. Also, there is no particular limitation on the shape of the bridges, and the bridges can be formed into various shapes, e.g., can be arranged so as to extend obliquely or can be formed into a wave shape. Note that the bridges and the second heating wires 63 can be formed as a single piece using the same metal material.

5. There is no particular limitation on the shapes of the glass plates 1 and 2 so long as the upper side 11, the lower side 12, the left side 13, and the right side 14 can be identified from external shapes of the glass plates, and the shapes of the glass plates do not necessarily have to be rectangular. Also, the sides 11 to 14 may also be curved, rather than being straight.

6. The plurality of second heating wires 63 do not necessarily have to be arranged parallel to each other, and may also form an irregular shape such as a mesh shape. In the above-described embodiment, the heating wires 63 are connected in parallel with the bus bars 61 and 62 serving as electrodes, but the heating wires 63 may also be connected in series. A configuration is also possible in which heating wires 63 that are bent a plurality of times are arranged between the bus bars 61 and 62.

7. In the above-described second embodiment, the bus bars 61 and 62 are respectively arranged along the upper side and the lower side of the glass plates, but a configuration is also possible in which the bus bars 61 and 62 are arranged along the left side and the right side of the glass plates so that the second heating wires 63 extend in the left-right direction.

LIST OF REFERENCE NUMERALS

1 Outer glass plate
2 Inner glass plate
3 Interlayer
31 Heat generation layer
311 Base material
312 First bus bar
313 Second bus bar
314 Heating wire

The invention claimed is:

1. A windshield for an automobile to which an information acquisition device for acquiring information from the outside of a vehicle by emitting and/or receiving light can be installed, the windshield comprising:
an outer glass plate that includes a first side and a second side that is opposite to the first side;
an inner glass plate that is arranged opposite to the outer glass plate and has substantially the same shape as the outer glass plate; and
an intermediate film that is arranged between the outer glass plate and the inner glass plate,
wherein the windshield includes an information acquisition region that is to be located opposite to the information acquisition device and through which the light passes,
the intermediate film includes:
at least one adhesive layer; and
a heat generation layer that is supported by the adhesive layer,
the heat generation layer includes, at least in a region that corresponds to the information acquisition region:
a pair of bus bars that are arranged such that the information acquisition region is interposed therebetween; and
a plurality of first heating wires that are connected in parallel so as to connect the bus bars to each other, and each of the heating wires has a wire width not larger than 10 μm.

2. The windshield according to claim 1, wherein at least in a portion of each of the first heating wires, the wire width of the first heating wire is equal to or larger than a thickness of the first heating wire.

3. The windshield according to claim 1, wherein the information acquisition region has an area not larger than 10000 mm$^2$.

4. The windshield according to claim 1, wherein adjacent first heating wires of the first heating wires are not connected to each other.

5. The windshield according to claim 1, wherein the information acquisition region is located within a distance of 200 mm from an edge of the outer glass plate.

6. The windshield according to claim 1, wherein the plurality of first heating wires extend in an up-down direction.

7. The windshield according to claim 1, wherein a pitch between the first heating wires is 0.3 to 10 mm.

8. The windshield according to claim 1,
wherein the heat generation layer further includes:
a first side bus bar of which at least a portion extends along an end portion on the first side;
a second side bus bar of which at least a portion extends along an end portion on the second side; and
a plurality of second heating wires that are arranged so as to connect the first side bus bar and the second side bus bar to each other.

9. The windshield according to claim 8, wherein one of the first side bus bar and the second side bus bar constitutes a single piece together with either of the bus bars that are arranged such that the information acquisition region is interposed therebetween.

10. The windshield according to claim 8,
wherein the second heating wires are arranged in a view field region outside the information acquisition region,
a heat generation amount per unit area of the information acquisition region is larger than a heat generation amount per unit area of the view field region, and
the first heating wires have a smaller wire width than the second heating wires.

11. The windshield according to claim 8, wherein a pitch between the first heating wires is smaller than a pitch between the second heating wires.

* * * * *